US012513453B2

(12) United States Patent
Zhou et al.

(10) Patent No.: US 12,513,453 B2
(45) Date of Patent: Dec. 30, 2025

(54) MICROPHONES

(71) Applicant: SHENZHEN SHOKZ CO., LTD., Guangdong (CN)

(72) Inventors: Wenbing Zhou, Shenzhen (CN); Yujia Huang, Shenzhen (CN); Yongshuai Yuan, Shenzhen (CN); Wenjun Deng, Shenzhen (CN); Xin Qi, Shenzhen (CN); Fengyun Liao, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 148 days.

(21) Appl. No.: 18/344,810

(22) Filed: Jun. 29, 2023

(65) Prior Publication Data

US 2023/0345170 A1 Oct. 26, 2023

Related U.S. Application Data

(63) Continuation of application No. PCT/CN2021/133279, filed on Nov. 25, 2021.

(51) Int. Cl.
*H04R 1/28* (2006.01)
*H04R 1/08* (2006.01)

(52) U.S. Cl.
CPC ............. *H04R 1/2807* (2013.01); *H04R 1/08* (2013.01)

(58) Field of Classification Search
CPC ........ H04R 1/2807; H04R 1/08; H04R 1/342; H04R 2201/003
See application file for complete search history.

(56) References Cited

U.S. PATENT DOCUMENTS

| | | | |
|---|---|---|---|
| 4,843,628 | A | 6/1989 | Hofer |
| 2011/0235841 | A1 | 9/2011 | Tanaka et al. |
| 2013/0070951 | A1 | 3/2013 | Tanaka et al. |
| 2015/0003638 | A1 | 1/2015 | Kasai |
| 2015/0181346 | A1 | 6/2015 | Jingming |
| 2021/0204056 | A1 | 7/2021 | Bradt et al. |

FOREIGN PATENT DOCUMENTS

| | | | |
|---|---|---|---|
| CN | 106208799 | A | 12/2016 |
| GB | 915811 | A | 1/1963 |
| JP | 2013110581 | A | 6/2013 |
| TW | 201830982 | A | 8/2018 |
| WO | 0193344 | A1 | 12/2001 |

OTHER PUBLICATIONS

International Search Report in PCT/CN2021/133279 mailed on Aug. 5, 2022, 6 pages.
Li, Wei et al., Study on the Influence of Microphone Acoustic Structure on Call Bandwidth, Science and technology wind, 2017, 2 pages.

*Primary Examiner* — Tuan D Nguyen
(74) *Attorney, Agent, or Firm* — METIS IP LLC

(57) ABSTRACT

The present disclosure provides a microphone comprising: an acoustoelectric transducer configured to convert an sound signal to an electrical signal; an acoustic structure, the acoustic structure comprising a sound guiding tube and an acoustic cavity, the acoustic cavity being acoustically communicated with the acoustoelectric transducer and acoustically communicated with the outside of the microphone through the sound guiding tube; wherein the acoustic structure has a first resonant frequency, the acoustoelectric transducer has a second resonant frequency, and an absolute value of the difference between the first resonant frequency and the second resonant frequency is not greater than 1000 Hz.

19 Claims, 17 Drawing Sheets

MICROPHONES

CROSS-REFERENCE TO RELATED APPLICATIONS

This application is a Continuation of International Application No. PCT/CN2021/133279, filed on Nov. 25, 2021, the entire contents of which are hereby incorporated by reference.

TECHNICAL FIELD

The present disclosure relates to the field of acoustic devices, and in particular to microphones.

BACKGROUND

A microphone is a transducer that converts a sound signal into an electrical signal. An external sound signal can enter an internal cavity of the microphone through a hole in the housing and cause the air in the cavity to vibrate. An acoustoelectric transducer of the microphone receives an air vibration signal and converts the vibration signal into an electrical signal. The acoustoelectric transducer has a resonant frequency, and the response of a vibration sensor device to an external vibration signal may be expressed as its corresponding frequency response curve having a resonant peak close to the resonant frequency. The intensity of resonance produced by the acoustoelectric transducer at its resonant frequency is relatively limited, making the sensitivity of the microphone relatively low. Therefore, it is desirable to provide a microphone that has a relatively high sensitivity at its resonant frequency.

SUMMARY

According to some embodiments of the present disclosure, a microphone is provided, including: an acoustoelectric transducer configured to convert an sound signal to an electrical signal; an acoustic structure including a sound guiding tube and an acoustic cavity, the acoustic cavity is acoustically communicated with the acoustoelectric transducer and being acoustically communicated with an outside of the microphone through the sound guiding tube; wherein the acoustic structure has a first resonant frequency, the acoustoelectric transducer has a second resonant frequency, and an absolute value of a difference between the first resonant frequency and the second resonant frequency is not greater than 1000 Hz.

In some embodiments, the microphone further includes a housing and a plate body, wherein the plate body divides a space inside the housing into at least two cavities, the at least two cavities include a first cavity and the acoustic cavity, and the acoustoelectric transducer is provided in the first cavity.

In some embodiments, the microphone further includes a sound inlet, wherein the sound inlet is provided on the plate body, the acoustic cavity is acoustically communicated with the acoustoelectric transducer through the sound inlet, and the sound guiding tube is provided on a cavity wall forming the acoustic cavity.

In some embodiments, the acoustoelectric transducer is located in the acoustic cavity of the acoustic structure, and the sound signal enters the acoustic cavity through the sound guiding tube and is transmitted to the acoustoelectric transducer.

In some embodiments, the first resonant frequency or the second resonant frequency is within a range of 100 Hz-12000 Hz.

In some embodiments, an absolute value of a difference between the first resonant frequency and the second resonant frequency is not greater than 100 Hz.

In some embodiments, the first resonant frequency is equal to the second resonant frequency.

In some embodiments, a response sensitivity of the microphone at the first resonant frequency is greater than that of the acoustoelectric transducer at the first resonant frequency, and/or the response sensitivity of the microphone at the second resonant frequency is greater than that of the acoustoelectric transducer at the second resonant frequency.

In some embodiments, the first resonant frequency is related to one or more structural parameters of the acoustic structure, and the second resonant frequency is related to one or more structural parameters of the acoustoelectric transducer.

In some embodiments, the one or more structural parameters of the acoustic structure include one or more of a shape of the sound guiding tube, a dimension of the sound guiding tube, a dimension of the acoustic cavity, an acoustic resistance of the sound guiding tube or the acoustic cavity, and a roughness degree of an inner surface of a side wall of the sound guiding tube.

In some embodiments, the one or more structural parameters of the acoustoelectric transducer include one or more of a type of the acoustoelectric transducer, a material of the acoustoelectric transducer, a dimension of the acoustoelectric transducer, and an arrangement of the acoustoelectric transducer.

In some embodiments, the microphone further includes a second acoustic structure including a second sound guiding tube and a second acoustic cavity, the second acoustic cavity is acoustically communicated with the outside of the microphone through the second sound guiding tube, and the second acoustic cavity is acoustically communicated with the acoustic cavity through the sound guiding tube; wherein, the second acoustic structure has a third resonant frequency, the third resonant frequency is different from the first resonant frequency and/or the second resonant frequency, and an absolute value of a difference between any two of the third resonant frequency, the first resonant frequency, and the second resonant frequency is within a range of 100 Hz-1000 Hz.

In some embodiments, the microphone further includes the second acoustic structure including the second sound guiding tube and the second acoustic cavity, wherein the second acoustic cavity is acoustically communicated with the outside of the microphone through the second sound guiding tube; and the second acoustic cavity is acoustically communicated with the acoustic cavity through the sound guiding tube; wherein the second acoustic structure has the third resonant frequency, and values of at least two of the third resonant frequency, the first resonant frequency, and the second resonant frequency are the same.

In some embodiments, the microphone further includes the first plate body and the second plate body, whereon the first plate body and the second plate body divide a space inside the housing into the first cavity, the acoustic cavity, and a second acoustic cavity; the first plate body and at least a portion of the housing define the first cavity; the first plat body, the second plate body, and the at least a portion of the housing define the acoustic cavity; and the second plate body and at least a portion of housing define the second acoustic cavity.

In some embodiments, the microphone further includes the sound inlet, the acoustoelectric transducer is provided in the first cavity, the sound inlet is provided on the first plate body, the sound guiding tube is provided on the second plate body, and the second sound guiding tube is provided on a cavity wall forming the second acoustic cavity.

In some embodiments, it further includes a second acoustic structure and a third acoustic structure, wherein the second acoustic structure includes the second sound guiding tube and a second acoustic cavity. The third acoustic structure includes a third sound guiding tube, a fourth sound guiding tube, and a third acoustic cavity. The acoustic cavity is acoustically communicated with the third acoustic cavity through the third sound guiding tube. The second acoustic cavity is acoustically communicated with the outside of the microphone through the second sound guiding tube and acoustically communicated with the third acoustic cavity through the fourth sound guiding tube. The third acoustic cavity is acoustically communicated with the acoustoelectric transducer.

In some embodiments, the microphone further includes a first plate body, a second plate body, and a third plate body, wherein the third plate body is physically connected to the second plate body and the housing. The first plate body and at least a portion of housing define the first cavity, the acoustoelectric transducer is located in the first cavity. The first plate body, the second plate body, and the at least a portion of the housing define the third acoustic cavity. The second plate body, the third plate body, and the at least a portion of the housing define the acoustic cavity. The second plate body, the third plate body, and the at least a portion of the housing define the second acoustic cavity.

In some embodiments, the microphone further includes the sound inlet, wherein the sound inlet is provided on the first plate body, the third sound guiding tube and the fourth sound guiding tube are provided on the second plate body, the sound guiding tube is provided on the cavity wall forming the acoustic cavity, and the second sound guiding tube is provided on the cavity wall forming the second acoustic cavity.

In some embodiments, the second acoustic structure has a third resonant frequency, the third acoustic structure has a fourth resonant frequency. The fourth resonant frequency, the third resonant frequency, the first resonant frequency, and the second resonant frequency are different, and an absolute value of a difference between any two of the fourth resonant frequency, the third resonant frequency, the first resonant frequency, and the second resonant frequency is within a range of 100 Hz-1000 Hz.

In some embodiments, the second acoustic structure has the third resonant frequency and the third acoustic structure has the fourth resonant frequency. At least two resonant frequencies of the fourth resonant frequency, the third resonant frequency, the first resonant frequency, and the second resonant frequency are the same.

In some embodiments, the acoustic structure includes a plurality of acoustic sub-structures, and the microphone includes a plurality of acoustoelectric transducers, the plurality of acoustoelectric transducers correspond to the plurality of acoustic sub-structures one by one, each acoustic sub-structure includes a sub-sound guiding tube and an acoustic sub-cavity, the acoustic sub-cavity of each acoustic sub-structure is acoustically communicated with a corresponding acoustoelectric transducer and acoustically communicated with the outside of the microphone through the sub-sound guiding tube.

In some embodiments, an absolute value of a difference between a resonant frequency of the acoustic sub-structure and a resonant frequency of the acoustoelectric transducer corresponding to the acoustic sub-structure is not greater than 200 Hz.

In some embodiments, the resonant frequency of the acoustic sub-structure is equal to the resonant frequency of the acoustoelectric transducer corresponding to the acoustic sub-structure.

In some embodiments, a response sensitivity of the microphone at a resonant frequency of the acoustic sub-structure is greater than a response sensitivity of the acoustoelectric transducer at the resonant frequency of the acoustic sub-structure, and/or the response sensitivity of the microphone at the resonant frequency of the acoustoelectric transducer is greater than the response sensitivity of the acoustoelectric transducer at the resonant frequency of the acoustoelectric transducer.

In some embodiments, a shape of a cross-section of the sound guiding tube is circular.

In some embodiments, a value of an inner diameter of the sound guiding tube is within a range of 0.2 mm-2 mm.

In some embodiments, a value of a length of the sound guiding tube is within a range of 1 mm-4 mm.

In some embodiments, a value of a length of the sound guiding tube is within a range of 1 mm-3 mm.

In some embodiments, a ratio of the inner diameter of the sound guiding tube to the length of the sound guiding tube is not greater than 1.5.

In some embodiments, a value of an equivalent inner diameter of the acoustic cavity is within a range of 1 mm-6 mm.

In some embodiments, a value of an equivalent inner diameter of the acoustic cavity is within a range of 1 mm-5 mm.

In some embodiments, a value of a thickness of the acoustic cavity is within a range of 1 mm-4 mm.

In some embodiments, a value of a thickness of the acoustic cavity is within a range of 1 mm-3 mm.

In some embodiments, a ratio of an equivalent inner diameter of the acoustic cavity to a thickness of the acoustic cavity is greater than or equal to 1.

BRIEF DESCRIPTION OF THE DRAWINGS

The present disclosure will be further illustrated by way of exemplary embodiments, which will be described in detail by way of the accompanying drawings. These embodiments are not limiting, and in these embodiments the same numbering indicates the same structure, where.

DETAILED DESCRIPTION

Figure 1:
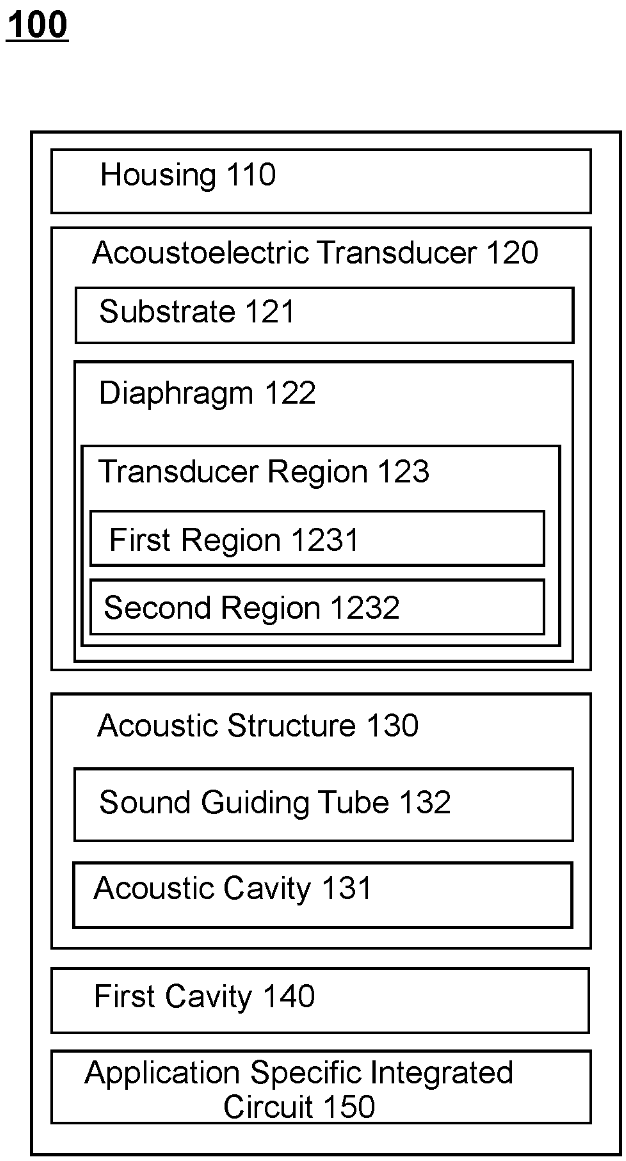
FIG. 1 is a schematic diagram illustrating a simple structure of a microphone according to some embodiments of the present disclosure.

To illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. It should be understood that these exemplary embodiments are merely provided for those skilled in the art to better comprehend thereby realizing the present disclosure, but not limit the scope of the present disclosure in any way. Unless apparent from the locale or otherwise stated, like reference numerals represent similar structures or operations throughout the several views of the drawings.

It will be understood that the term “system,” “device,” “unit,” and/or “component,” and “element” used herein are one method to distinguish different components, elements, parts, sections, or assemblies of different levels in ascending order. However, the terms may be displaced by another expression if they achieve the same purpose.

Various terms are used to describe the spatial and functional relationships between elements (e.g., between components), including “connection,” “joining,” “interface,” and “coupling”. Unless explicitly described as “direct,” when describing the relationship between the first and second elements in the present disclosure, the relationship includes a direct relationship where no other intermediate element exists between the first and second elements, and an indirect relationship where one or more intermediate elements exist (spatially or functionally) between the first and second elements. Conversely, when the element is said to be “directly” connected, joined, interfaced or coupled to another element, there is no intermediate element. In addition, spatial and functional relationships between components may be achieved in a variety of ways. For example, a mechanical connection between two elements may include a welded connection, a key connection, a pin connection, an interference fit connection, etc., or any combination thereof. Other terms used to describe the relationship between elements should be interpreted in a similar manner (e.g., “between,” “with . . . between,” “adjacent” and “directly adjacent,” etc.).

It should be understood that the terms “first,” “second,” “third,” etc., as used herein, may be used to describe various components. These are used only to distinguish one component from another and are not intended to limit the scope of the components. For example, a first element may also be referred to as a second element, and similarly, the second element may also be referred to as the first element.

As shown in the present disclosure and claims, unless the context clearly suggests an exception, the words “one,” “a,” “an” and/or “the” are not specific to the singular form, but may further include the plural form. In general, the terms “include” and “comprises” suggest only the inclusion of clearly identified steps and elements that do not constitute an exclusive list, and the method or apparatus may also contain other steps or elements. The term “based on” is “based, at least in part, on”. The term “an embodiment” means “at least one embodiment”, the term “another embodiment” means “at least one additional embodiment”. Definitions of other terms will be given in the description below. In the following, without loss of generality, the description of “microphone,” or “transducer” will be used when describing a vibration signal related technology in the present disclosure. The descriptions are merely forming of the conduction application, and for those skilled in the art, the terms “transducer” or “microphone” may be replaced by other similar terms, such as “hydrophone,” “transducer,” “acousto-optical modulator” or “acoustoelectric conversion device,” etc. For professionals in the field, after understanding the basic principle of the microphone device, it is possible to make various corrections and amendments in the form and details of the specific ways and steps of implementing the microphone without departing from this principle. However, these amendments and variations remain within the scope of protection of the present disclosure.

The present disclosure provides a microphone. The microphone may include an acoustoelectric transducer and an acoustic structure. The acoustoelectric transducer includes a substrate and a diaphragm connected to the substrate. The acoustoelectric transducer may be used to convert a sound signal to an electrical signal. The acoustic structure includes a sound guiding tube and an acoustic cavity. The acoustic cavity is acoustically communicated with the acoustoelectric transducer and acoustically communicated with the outside of the microphone through the sound guiding tube. The sound guiding tube and the acoustic cavity of the acoustic structure may form a filter having the function of adjusting sound frequency components. Filtering characteristics of the acoustic structure are determined by one or more structural parameters of its structure, and a process of filtering occurs in real time. The acoustic structure may have a first resonant frequency, i.e., a component of the sound signal at the first resonant frequency can resonate within the acoustic structure, and a frequency component close to the first resonant frequency is amplified. The acoustoelectric transducer may have a second resonant frequency, i.e., a component of the sound signal at the second resonant frequency can resonate within the acoustic structure, and a frequency component close to the second resonant frequency is amplified. In some embodiments, the dimension, location, etc., of the first resonant frequency and/or the second resonant frequency may be adjusted by adjusting the one or more structural parameters of the acoustoelectric transducer and/or the acoustic structure. For example, the first resonant frequency may be reduced by adjusting an equivalent stiffness and an equivalent mass of the acoustoelectric transducer, so that an absolute value of a difference between the first resonant frequency and the second resonant frequency may be no more than 1000 Hz, thereby allowing the frequency component of the sound signal close to the first resonant frequency to be amplified while the frequency components close to the second resonant frequency are secondly "amplified," thereby improving a Q value and a sensitivity of the microphone close to a resonant peak corresponding to the second resonance frequency. In some embodiments, the first resonant frequency may be adjusted to make the first resonant frequency equal to the second resonant frequency, so that the frequency component close to the first resonant frequency/the second resonant frequency can be "amplified" twice, and the Q value and the sensitivity of the microphone close to the resonant peak corresponding to the first resonant frequency can be improved without increasing a count of acoustoelectric transducers.

FIG. 1 is a schematic diagram illustrating a simple structure of a microphone according to some embodiments of the present disclosure. As shown in FIG. 1, a microphone 100 may include a housing 110, an acoustoelectric transducer 120, an acoustic structure 130, a first cavity 140, and an application-specific integrated circuit 150.

In some embodiments, the microphone 100 may include any sound signal processing device that converts a sound signal to an electrical signal, for example, a microphone, a hydrophone, an acoustic-optic modulator, etc., or other acoustoelectric conversion devices. In some embodiments, differentiated by the principle of energy conversion, the microphone 100 may include a dynamic microphone, a ribbon microphone, a capacitive microphone, a piezoelectric microphone, an electret microphone, an electromagnetic microphone, a carbon particle microphone, etc., or any combination thereof. In some embodiments, differentiated by the way of sound collection, the microphone 100 may include an air-conduction microphone or a combined air-conduction and bone-conduction microphone. In some embodiments, differentiated by production process, the microphone 100 may include an electret microphone, a silicon microphone, etc. In some embodiments, the microphone 100 may be provided on a mobile device (e.g., a cell phone, a voice recorder, etc.), a tablet computer, a laptop, a vehicle built-in device, a surveillance device, a medical device, a sports device, a toy, a wearable device (e.g., a headphone, a helmet, glasses, a necklace, etc.), and other devices having a function of picking up a sound.

The housing 110 may be configured to accommodate one or more components of the microphone 100 (e.g., at least one acoustoelectric transducer 120, the acoustic structure 130, etc.). In some embodiments, the housing 110 may be a regular structural body such as a rectangular body, a cylinder, a prism, a dome, or other irregular structural bodies. In some embodiments, the housing 110 is an internally hollow structural body that may form one or more acoustic cavities. In some embodiments, the microphone 100 may include a plate body (e.g., a plate body 1412 shown in FIG. 14), and the plate body 1412 may be disposed in the acoustic cavity formed by the housing 110. For example, a circumferential side of the plate body 1412 may be connected to an inner wall of the housing 110, thereby separating the acoustic cavity formed by the housing 110 into the acoustic cavity 131 and the first cavity 140. The first cavity 140 may be used to accommodate the acoustoelectric transducer 120 and the application-specific integrated circuit 150. The acoustic cavity 131 may accommodate or be at least a portion of the acoustic structure 130. In some embodiments, the acoustoelectric transducer 120 may be provided in the acoustic cavity 131 of the acoustic structure 130. Details of the acoustoelectric transducer being provided in the acoustic cavity of the acoustic structure may be found in FIG. 2 and its related descriptions. For the convenience of description, the present disclosure is mainly illustrated with the acoustoelectric transducer 120 being provided in the first cavity 140, and a case of the acoustoelectric transducer 120 being provided in the acoustic cavity 131 of the acoustic structure 130 may be the same or similar.

In some embodiments, the material of the housing 110 may include, but is not limited to, one or more of metals, alloy materials, polymeric materials (e.g., acrylonitrile-butadiene-styrene copolymer, polyvinyl chloride, polycarbonate, polypropylene, etc.), etc.

In some embodiments, the acoustoelectric transducer 120 may be used to convert a sound signal to an electrical signal. Exemplarily, taking the embodiment shown in FIG. 14 as an example, a microphone 1400 may include one or more sound inlets 1421, the one or more sound inlets 1421 are located on the plate body 1412. An acoustic structure 1430 may be communicated with at least one acoustoelectric transducer 1420 through the one or more sound inlets 1421 on the plate body 1412, and transmit the sound signal adjusted by the acoustic structure 1430 to the acoustoelectric transducer 1420. As another example, an external sound signal picked up by the microphone 1400 may enter a cavity (if any) of the acoustoelectric transducer 1420 through the sound inlet 1421 after being adjusted (e.g., filtered, crossed, amplified, etc.) by the acoustic structure 1430. The acoustoelectric transducer 120 may pick up and convert the sound signal to an electrical signal.

In some embodiments, the acoustoelectric transducer 120 may include one or more of a capacitive acoustoelectric transducer, a piezoelectric acoustoelectric transducer, an electret acoustoelectric transducer, an electromagnetic acoustoelectric transducer, a ribbon acoustoelectric transducer, and the like. In some embodiments, a vibration of the sound signal (e.g., an air vibration, a solid vibration, a liquid vibration, a magnetically induced vibration, an electrically induced vibration, etc.) may cause a change in one or more parameters of the acoustoelectric transducer 120 (e.g., a capacitance, a charge, an acceleration, a light intensity, a frequency response, etc., or a combination thereof). The changed parameters may be detected by using an electrical method and output an electrical signal corresponding to the sound signal. A piezoelectric acoustoelectric transducer may be a component that converts a change in non-electric quantity (e.g., a pressure, a displacement, etc.) to be measured to a change in voltage. For example, the piezoelectric acoustoelectric transducer may include a cantilever beam structure (or the diaphragm 122) that can be deformed by a received sound signal, and an inverse piezoelectric effect caused by the deformed cantilever beam structure may produce an electrical signal. The capacitive acoustoelectric transducer may be a component that converts a change in the non-electric quantity to be measured (e.g., a displacement, a pressure, a light intensity, an acceleration, etc.) into a change in capacitance. For example, the capacitive acoustoelectric transducer may include a first cantilever beam structure and a second cantilever beam structure, and the first cantilever beam structure and the second cantilever beam structure may deform to different degrees under the vibration, thereby causing a spacing between the first cantilever beam structure and the second cantilever beam structure to change. The first cantilever beam structure and the second cantilever beam structure may convert the change of the spacing between the two to a change of capacitance, thereby realizing the conversion of the vibration signal to the electrical signal.

In some embodiments, the acoustoelectric transducer 120 may have a second resonant frequency, i.e., the component of the second resonant frequency in the sound signal can resonate during a process of acoustoelectric conversion of the acoustoelectric transducer 120, thereby causing a frequency response curve of the microphone 100 to produce a second resonant peak at the second resonant frequency. In some embodiments, the second resonant frequency is related to the one or more structural parameters of the acoustoelectric transducer 120. In some embodiments, the one or more structural parameters of the acoustoelectric transducer may include, but are not limited to, one or more of a type of the acoustoelectric transducer, the material of the acoustoelectric transducer, a dimension of the acoustoelectric transducer, the arrangement of the acoustoelectric transducer, and a structure of an internal component of the acoustoelectric transducer. For example, the dimension of the acoustoelectric transducer may include a length, a width, a thickness, etc., of an internal component (e.g., a cantilever beam, a diaphragm 122, a mass component, etc.) of the acoustoelectric transducer. The material of the acoustoelectric transducer may include materials of layers (e.g., an elastic layer, a piezoelectric layer, an electrode layer, etc.) forming the internal component (e.g., a diaphragm) of the acoustoelectric transducer. The arrangement of the acoustoelectric transducer may include one or more of a linear arrangement, a circular arrangement, a spiral arrangement, and the like. The structure of the internal component of the acoustoelectric transducer may include the structure of the internal component (e.g., the diaphragm) forming the acoustoelectric transducer. In some embodiments, the count of acoustoelectric transducers 120 may be set according to practical needs. For example, a plurality of acoustic structures 130 of the microphone 100 may be connected to the same acoustoelectric transducer 120. As another example, each acoustic structure 130 of the plurality of acoustic structures may be connected to one acoustoelectric transducer 120.

In some embodiments, the acoustoelectric transducer 120 may include a substrate 121 and a diaphragm 122 connected to the substrate 121. In some embodiments, the substrate 121 may be a regular or an irregular three-dimensional structure having a hollow portion inside. For example, the substrate 121 may be a hollow frame structure body, which includes, but is not limited to, a regular shape such as a rectangular frame, a circular frame, a square polygon frame, and any irregular shape. The diaphragm 122 may be located in a hollow portion of the substrate 121 or at least partially suspended above the hollow portion of the substrate 121. The portion of the diaphragm 122 located in the hollow portion of the substrate 121 may be referred to as a transducer region 123. The transducer region 123 may convert the sound signal into the electrical signal. In some embodiments, at least a portion of the structure of the diaphragm 122 is physically connected to the substrate 121. The "connection" here may be understood to mean that after preparing the diaphragm 122 and the substrate 121 separately, the diaphragm 122 and the substrate 121 are fixedly connected by gluing, welding, riveting, clamping, bolting, etc., or during the preparation process, the diaphragm 122 is deposited on the substrate 121 through physical deposition (e.g., physical vapor deposition) or chemical deposition (e.g., chemical vapor deposition). In some embodiments, the at least a portion of the structure of the diaphragm 122 may be secured to an upper surface or a lower surface of the substrate 121, or the at least a portion of the structure of the diaphragm 122 may also be secured to the sidewall of the substrate 121. For example, the circumferential side of the diaphragm 122 may be connected to the upper surface of the substrate 121, the lower surface of the substrate 121, or the side wall of the substrate 121 where the hollow portion of the substrate 121 is located. It should be noted that the term "located in the hollow portion of the substrate 121" or "suspended in the hollow portion of the substrate 121" in the present disclosure may mean to be suspended inside, below, or above the hollow portion of the substrate 121. For example, in the embodiment shown in FIG. 4, a portion of a diaphragm 322 (i.e., a transducer region 323) is suspended above the hollow portion of the substrate 321. In some embodiments, the diaphragm 122 may include a vibration unit and an acoustic transducer unit. In some application scenarios, the diaphragm 122 may produce the vibration based on the external vibration signal, and the vibration unit deforms in response to the vibration of the diaphragm 122. The acoustic transducer unit may produce the electrical signal based on the deformation of the vibration unit. The descriptions of the vibration unit and the acoustic transducer unit in the present disclosure are merely provided for the purpose of facilitating to introduce a working principle of the diaphragm 122, and do not limit the actual composition and structure of the diaphragm 122. In other embodiments, the vibration unit may not be necessary and its function may be fully realized by the acoustic transducer unit. For example, after the structure of the acoustic transducer unit is changed to some extent, the acoustic transducer unit may directly response to the vibration of the diaphragm 122 to produce the electrical signal.

The acoustic transducer unit refers to a portion of the diaphragm 122 that converts the deformation of the vibration unit into an electrical signal. In some embodiments, the acoustic transducer unit may include at least two electrode layers (e.g., a first electrode layer and a second electrode layer), and a piezoelectric layer. The piezoelectric layer may be located between the first electrode layer and the second electrode layer. The piezoelectric layer is a structure that may produce a voltage at its two side surfaces when subjected to an external force. In some embodiments, the piezoelectric layer may be a piezoelectric polymer membrane obtained by a deposition process of a semiconductor (e.g., magnetron sputtering, metal-organic chemical vapor deposition (MOCVD)). In embodiments of the present disclosure, the piezoelectric layer may produce the voltage under a deformation stress of the vibration unit, and the first electrode layer and the second electrode layer may collect the voltage (the electrical signal). In some embodiments, the material of the piezoelectric layer may include a piezoelectric membrane material. The piezoelectric membrane material may be a thin membrane material (e.g., AlN thin membrane material) made by a deposition process (e.g., a deposition process of magnetron sputtering). In other embodiments, the material of the piezoelectric layer may include a piezoelectric crystal material and a piezoelectric ceramic material. The piezoelectric crystal is a piezoelectric single crystal. In some embodiments, the piezoelectric crystal material may include crystals, sphalerite, boronite, tourmaline, red zincite, gallium arsenide (GaAs), barium titanate (BT) and its derived structural crystals, $KH_2PO_4$, $NaKC_4H_4O_6$-$4H_2O$ (rosin salt), etc., or any combination thereof. The piezoelectric ceramic material refers to piezoelectric polycrystals formed by irregular collection of microfine grains obtained by a solid-phase reaction and sintering between powder grains of different materials. In some embodiments, the piezoelectric ceramic material may include the barium titanate, lead zirconate titanate (PZT), lead barium lithium niobate (PBLN), modified lead titanate, aluminum nitride (AlN), zinc oxide (ZnO), etc., or any combination thereof. In some embodiments, the material of the piezoelectric layer may also be a piezoelectric polymer material, such as polyvinylidene fluoride (PVDF), etc.

In some embodiments, the substrate 121 and the diaphragm 122 may be located inside the housing 110, the substrate 121 is fixedly connected to the inner wall of the housing 110, and the diaphragm 122 is carried on the substrate 121. An air vibration may enter the interior of the acoustoelectric transducer through a sound inlet of the microphone 100 and cause the diaphragm 122 to vibrate. Exemplarily, in the embodiment shown in FIG. 14, the air vibration may enter the interior of the acoustoelectric transducer through a sound guiding tube 1432 and a sound inlet 1421 in turn, which causes the diaphragm 122 to vibrate, thereby causing the vibration unit of the diaphragm 122 to deform. In some embodiments, when the vibration unit is deformed, the piezoelectric layer of the acoustic transducer unit is subjected to the deformation stress of the vibration unit to produce a potential difference (voltage), and the at least two electrode layers (e.g., the first electrode layer and the second electrode layer) of the acoustic transducer unit respectively located on the upper surface and the lower surface of the piezoelectric layer may collect the potential difference, thereby converting the external vibration signal into the electrical signal. Merely as an exemplary description, the acoustoelectric transducer 120 described in embodiments of the present disclosure may be applied to a headphone (e.g., an air-conduction headphone), glasses, a virtual reality device, a helmet, etc. The acoustoelectric transducer 120 may pick up and convert a vibration signal (e.g., air vibration) into an electrical signal to achieve the collection of sound. It should be noted that the substrate 121 is not limited to a separate structure relative to the housing of the acoustoelectric transducer 120, and in some embodiments, the substrate 121 may also be a portion of the housing of the acoustoelectric transducer 120.

After receiving the external vibration signal (e.g., an air vibration signal), the acoustoelectric transducer 120 may convert the vibration signal into an electrical signal by using the diaphragm 122 (including the acoustic transducer unit and the vibration unit), and the electrical signal may be output after being processed by a back-end circuit (e.g., the application-specific integrated circuit 150). Under the action of an external vibration signal, when a frequency of the external force is the same as or close to a natural oscillation frequency of the system (the acoustoelectric transducer 120), a phenomenon where an amplitude sharply increases is called resonance, and the frequency at which resonance occurs is called “resonant frequency”. As described in the aforementioned embodiments, in the present disclosure, the resonant frequency of the acoustoelectric transducer 120 may be referred to as the second resonant frequency. The acoustoelectric transducer 120 has an intrinsic frequency. When the frequency of the external vibration signal approaches the intrinsic frequency, the diaphragm 122 produces a relatively large amplitude and outputs a relatively large electrical signal. Therefore, the response of the acoustoelectric transducer 120 to the external vibration may behave as generating a resonant peak close to the intrinsic frequency. Therefore, the resonant frequency of the acoustoelectric transducer 120 is numerically substantially equal to the intrinsic frequency. In some embodiments, the intrinsic frequency of the acoustoelectric transducer 120 may refer to the intrinsic frequency of the diaphragm 122.

Figure 2:
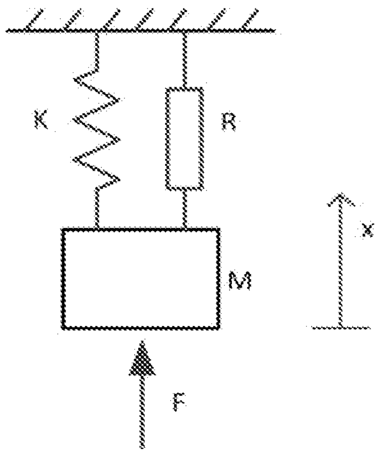
FIG. 2 is a schematic diagram illustrating a simplified mechanical model of an acoustoelectric transducer according to some embodiments of the present disclosure.

In some embodiments, the acoustoelectric transducer 120 at work, it can be equivalent to a mass-spring-damping system model shown in FIG. 2, which is forced to vibrate under the action of an exciting external force, and its vibration law conforms to a law of a mass-spring-damping system model. The motion of this system may be described by a differential equation (1):

$$M\frac{d^2x}{dt^2}+R\frac{dx}{dt}+Kx=F\cos\omega t, \tag{1}$$

where M denotes a mass of the system, R denotes a damping of the system, K denotes a coefficient of elasticity of the system, and F denotes an amplitude of a driving force, x denotes a displacement of the system, and ω denotes an angular frequency of the driving force. Solving a steady-state displacement based on equation (1) yields that:

$$x=x_a\cos(\omega t-\theta), \tag{2}$$

$$\text{where, } x_a=\frac{F}{\omega|Z|}=\frac{F}{\omega\sqrt{R^2+(\omega M-K\omega^{-1})^2}},$$

Further, based on the equation (1) and equation (2), a displacement amplitude ratio (normalized) equation may be obtained as:

$$A=\frac{x_a}{x_{a0}}=\frac{Q_m}{\sqrt{\frac{f^2}{f_0}+\left(\frac{f^2}{f_0}-1\right)^2Q_M^2}}, \tag{3}$$

where f denotes a frequency of the system, and $f_0$ denotes a resonant frequency of the system, i.e., the second resonant frequency $f_2$, $$Q_M = \frac{\omega_0 M}{R},$$

where $Q_M$ denotes a mechanical quality factor, and $$x_{a0} = \frac{F}{K}$$

may denote a static displacement amplitude (or a displacement amplitude when ω=0).

In some embodiments, under the action of the exciting external force, parameters influencing the second resonant frequency may include, but are not limited to, a system equivalent stiffness, a system equivalent mass, and a system equivalent relative damping coefficient (a damping ratio). In some embodiments, the system equivalent stiffness is positively correlated with the resonant frequency of a system of the acoustoelectric transducer, the system equivalent mass is negatively correlated with the system of the second resonant frequency of the acoustoelectric transducer, and the system equivalent relative damping coefficient (damping ratio) is negatively correlated with the system of the second resonant frequency of the acoustoelectric transducer. In some embodiments, the frequency response satisfies the following equation:

$$f_2 = \frac{1}{2\pi}\sqrt{\frac{k}{m}\left(1-\zeta^2\right)}, \tag{4}$$

where $f_2$ denotes the resonant frequency of the system of the acoustoelectric transducer 120, k denotes the system equivalent stiffness, m denotes the system equivalent mass, and ζ denotes the system equivalent relative damping coefficient (the damping ratio).

In some embodiments, for most acoustoelectric transducers, especially a piezoelectric-type acoustoelectric transducer, the corresponding system equivalent relative damping coefficient is usually small, and the resonant frequency of the system is mainly influenced by the equivalent stiffness and the equivalent mass. Taking the acoustoelectric transducer 320 shown in FIG. 3 and FIG. 4 as an example, its diaphragm 322 provides the effects of the spring, damping, and mass for the vibration system. Therefore, the diaphragm 322 mainly affects the system equivalent stiffness k, and affects the system equivalent mass m. Taking the acoustoelectric transducer 1020 shown in FIG. 10 and FIG. 11 as an example, a diaphragm 1022 provides the effects of the spring and damping for the vibration system, and the mass component 1025 provides the effect of the mass. Therefore, the diaphragm 1022 mainly affects the system equivalent stiffness k, and may also affect the equivalent mass m of the system. The mass component 1025 mainly affects the system equivalent mass m, and may also affect the system equivalent stiffness k. Therefore, the resonant frequency equation (4) may be simplified as follows:

$$f_2 = \frac{1}{2\pi}\sqrt{\frac{k}{m}}, \tag{5}$$

Based on equation (5), it can be known that the resonant frequency of the acoustoelectric transducer 120 (i.e., the second resonant frequency $f_2$) is related to the equivalent stiffness k and the equivalent mass m of its internal component (e.g., the diaphragm 122), i.e., the second resonant frequency $f_2$ of the acoustoelectric transducer 120 is positively related to the equivalent stiffness k of its internal component, and the second resonant frequency $f_2$ of the acoustoelectric transducer 120 is negatively related to the equivalent mass m of its internal components. The equivalent stiffness k may be a stiffness of the acoustoelectric transducer 120 when the acoustoelectric transducer 120 is equivalent to the mass-spring-damping system model, and the equivalent mass m is a mass of the acoustoelectric transducer 120 when the acoustoelectric transducer 120 is equivalent to the mass-spring-damping system model. In some embodiments, the equivalent stiffness k and/or the equivalent mass m of the diaphragm 122 can be adjusted to adjust the second resonant frequency $f_2$ of the acoustoelectric transducer 120.

In some embodiments, the second resonant frequency $f_2$ of the acoustoelectric transducer 120 may be adjusted by selecting different materials to produce the diaphragm 122 and the mass component mentioned below (e.g., the mass component 1025 in FIG. 11). In some embodiments, the second resonant frequency $f_2$ of the acoustoelectric transducer 120 may be adjusted by designing the structure of the acoustoelectric transducer 120, for example, the structure of the diaphragm 122 having different Young's modulus, the structure of the diaphragm 122 provided with a through-hole (e.g., a through-hole 92211 in FIG. 9), structures of the diaphragm 122 and the mass component. In some embodiments, the second resonant frequency $f_2$ of the acoustoelectric transducer 120 may be adjusted by designing dimensions of different components, e.g., designing the dimensions such as the length, the width, the thickness, etc., of the diaphragm 122 or the mass component, etc.

In some embodiments, the second resonant frequency $f_2$ of the acoustoelectric transducer 120 may be reduced by reducing the equivalent stiffness k of the diaphragm 122. In some embodiments, the transducer region 123 may include a first region 1231 and a second region 1232. The Young's modulus of the first region 1231 is greater than the Young's modulus of the second region 1232. In the present embodiment, by dividing the diaphragm 122 into the first region 1231 and the second region 1232 having different Young's moduli, and making the Young's modulus of the second region 1232 smaller than the Young's modulus of the first region 1231, the equivalent stiffness k of the diaphragm 122 may be effectively reduced, and ultimately reducing the second resonant frequency $f_2$ of the acoustoelectric transducer 120.

In some embodiments, shapes of the first region 1231 and the second region 1232 may include one of regular or irregular shapes such as a rectangle, circle, trapezoid, triangle, sector, or any combination thereof. For example, in the embodiment shown in FIG. 3, the shape of the first region 3231 is circular. As another example, the shape of the first region 1231 may be annular. The shapes of the first region 1231 and the second region 1232 may refer to shapes of projections of the first region 1231 and the second region 1232 along a thickness direction of the diaphragm 122.

Figure 3:
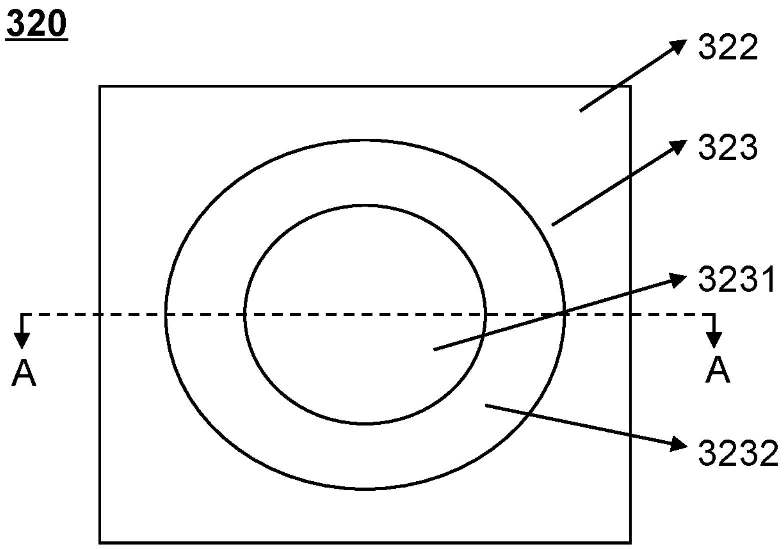
FIG. 3 is a schematic diagram illustrating an exemplary acoustoelectric transducer according to some embodiments of the present disclosure.
Figure 4:
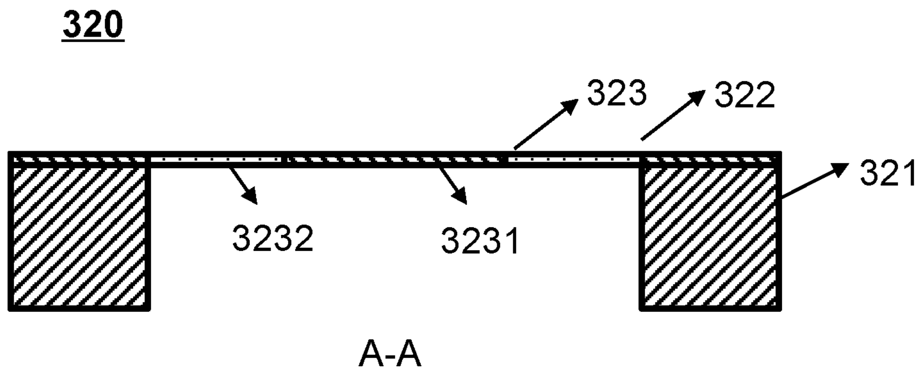
FIG. 4 is a schematic diagram of A-A cross-section in FIG. 3.

In some embodiments, the shapes of the first region 1231 and the second region 1232 may be the same or different. For example, the first region 1231 and the second region 1232 may both have a circular shape. In another example, as shown in FIG. 3 and FIG. 4, the shape of the first region 3231 may be circular, and the shape of the second region 3232 may be annular and the second region 3232 surrounds the circumference of the first region 3231.

In some embodiments, the equivalent stiffness k of the first region 1231 and the equivalent stiffness k of the second region 1232 directly affect the equivalent stiffness k of the acoustoelectric transducer 120. The equivalent stiffness k of the first region 1231 and the equivalent stiffness k of the second region 1232 are positively related to the Young's modulus of the materials forming the first region 1231 and the second region 1232. Therefore, the Young's modulus of the first region 1231 and the second region 1232 needs to be controlled to achieve a desired second resonant frequency $f_2$.

In some embodiments, the Young's modulus of the first region 1231 and the second region 1232 can be varied by changing the material from which they are made. In some embodiments, a semiconductor material may be used to produce the first region, e.g., silicon, silicon oxide, silicon nitride, silicon carbide, etc. In some embodiments, the polymeric materials may be used to produce the second region 1232, for example, polyimide (PI), polydimethylsiloxane (PDMS), poly(parylene), hydrogels, various photoresists, and different types of adhesives, including, but are not limited to, gel-based adhesive, organic silicone adhesive, acrylic adhesive, polyurethane adhesive, rubber-based adhesive, epoxy adhesive, hot melt adhesive, and UV-curable adhesive, and the like. In some embodiments, the material used to make the second region 1232 may be a silicone adhesive type glue or a silicone sealant type glue.

In some embodiments, a value of the Young's modulus of the first region 1231 may be within a range of 30 GPa-400 GPa. In some embodiments, a value of the Young's modulus of the first region 1231 may be within a range of 40 GPa-300 Gpa. In some embodiments, a value of the Young's modulus of the first region 1231 may be within a range of 50 GPa-200 GPa. In some embodiments, a value of the Young's modulus of the second region 1232 may be within a range of 50 GPa-20 GPa. In some embodiments, a value of the Young's modulus of the second region 1232 may be within a range of 75 kPa-15 GPa. In some embodiments, a value of the Young's modulus of the second region 1232 may be within a range of 100 kPa-10 GPa.

In embodiments of the present disclosure, it may be considered that the thickness of each part of the diaphragm 122 is the same or approximately the same. Approximately the same may mean that a difference in thickness between two parts does not exceed a set thickness difference threshold. For example, a difference in thickness is no more than 1%, 2%, 5%, etc., of the thickness of the diaphragm 122. In some embodiments, factors that can affect the equivalent stiffness k of the diaphragm 122 include an area of the first region 1231 and an area of the second region 1232 (i.e., a projected area of the first region 1231 and a projected area of the second region 1232 along the thickness direction of the diaphragm 122), so that the area of the first region 1231 and the area of the second region 1232 need to be controlled. In some embodiments, a value of a ratio of the area of the second region 1232 to the area of the first region 1231 may be within a range of 5%-2000%. In some embodiments, a value of a ratio of the area of the second region 1232 to the area of the first region 1231 may be within a range of 7.5%-1500%. In some embodiments, a value of a ratio of the area of the second region 1232 to the area of the first region 1231 may be within a range of 10%-1000%.

Figure 8:
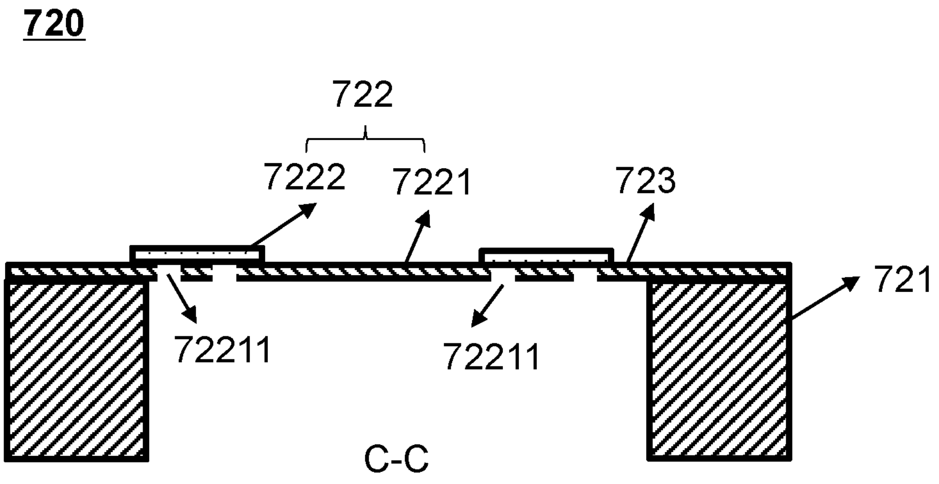
FIG. 8 is a schematic diagram illustrating a C-C section shown in FIG. 7.

In some embodiments, the diaphragm 122 may include a first diaphragm (e.g., the first diaphragm 7221 in FIG. 8) and a second diaphragm (e.g., the second diaphragm 7222 in FIG. 8). The circumferential side of the first diaphragm 7221 is connected to a substrate 721, and a through-hole 72211 is opened in a transducer region 723 of the first diaphragm 7221. The second diaphragm 7222 is provided on the upper surface of the first diaphragm 7221 and covers the through-hole 72211, and the Young's modulus of the first diaphragm 7221 is greater than the Young's modulus of the second diaphragm 7222. In some cases, the airtightness of the acoustoelectric transducer 720 may be effectively ensured by providing the second diaphragm 7222 to cover the through-hole 7221. In some cases, an overall equivalent stiffness k of the diaphragm 722 may be adjusted by replacing the second diaphragm 7222 having a different Young's modulus, thereby adjusting the second resonant frequency $f_2$ of the acoustoelectric transducer 720.

In some embodiments, a count of through-holes may be one, two, three, or more. For example, the shape of the transducer region 123 is circular, and a count of through-holes may be one and set in a center (i.e., a center of the through-hole coincides or approximately coincides with the center of the diaphragm 122) of the diaphragm 122 (e.g., the transducer region 123 of the diaphragm 122). As another example, in the embodiment shown in FIG. 7, the first diaphragm 7221 is provided with ten through-holes 72211.

In some embodiments, a plurality of through-holes may be provided on the diaphragm 122 (e.g., the transducer region 123) according to a certain pattern or randomly. Exemplarily, in the embodiment shown in FIG. 7, a shape of the transducer region 723 of the first diaphragm 7221 is circular, and the ten through-holes 72211 may be provided around the center of the first diaphragm 7221 or may be understood to be spaced along the circumference of the transducer region 723 of the first diaphragm 7221. In another embodiment, the plurality of through-holes may be arranged in a form of a matrix. In another embodiment, the plurality of through-holes may be arranged in a form of a line.

In some embodiments, the equivalent stiffness k of the diaphragm 122 is related to a diameter of the through-hole. For example, the larger the diameter of the through-hole, the smaller the stiffness of the diaphragm 122, and the smaller the diameter of the through-hole, the larger the stiffness of the diaphragm 122. For these reasons, the diameter of the through-hole needs to be controlled. In some embodiments, a value of the diameter of the through-hole may be within a range of 10 um-400 μm. In some embodiments, a value of the diameter of the through-hole may be within a range of 15 um-300 μm. In some embodiments, a value of the diameter of the through-hole may be within a range of 20 um-200 μm. In the present embodiment, the equivalent stiffness k of the diaphragm 122 may be adjusted by adjusting the diameter of the through-hole to achieve the desired second resonant frequency $f_2$ of the acoustoelectric transducer 120.

In some embodiments, the second diaphragm may merely cover the through-hole. For example, in the embodiment shown in FIG. 7 and FIG. 8, the shape of the second diaphragm 7222 is circular, and when the second diaphragm 7222 is provided on the upper surface of the first diaphragm 7221, the second diaphragm 7222 may precisely cover the ten through-holes 72211. In some other embodiments, the second diaphragm may cover an entire upper surface of the first diaphragm. For example, in the embodiment shown in FIG. 9, a first diaphragm 9221 and a second diaphragm 9222 are both rectangular. The length and width of the second diaphragm 9222 are the same as or approximately the same as the length and width of the first diaphragm 9221. The approximately same here may mean that a difference of length or width does not exceed a set threshold value. For example, the difference of length is not more than 1%, 2%, 3%, or 5% of the length of the first diaphragm 9221.

In some embodiments, the Young's modulus of the first diaphragm and the Young's modulus of the second diaphragm are positively correlated with the equivalent stiffness k of the acoustoelectric transducer 120, so that the Young's modulus of the first diaphragm and the Young's modulus of the second diaphragm needs to be controlled to achieve the desired second resonant frequency $f_2$. In some embodiments, a value of the Young's modulus of the first diaphragm may be within a range of 20 GPa-500 GPa. In some embodiments, a value of the Young's modulus of the first diaphragm may be within a range of 30 GPa-300 GPa. In some embodiments, a value of the Young's modulus of the first diaphragm may be within a range of 50 GPa-200 GPa. In some embodiments, a value of the Young's modulus of the second diaphragm may be within a range of 40 kPa-40 GPa. In some embodiments, a value of the Young's modulus of the second diaphragm may be within a range of 60 kPa-20 GPa. In some embodiments, a value of the Young's modulus of the second diaphragm may be within a range of 100 kPa-10 GPa.

In some embodiments, the overall equivalent stiffness of the first diaphragm and the second diaphragm is related to the thickness of the first diaphragm and the thickness of the second diaphragm, so that the thickness of the first diaphragm and the thickness of the second diaphragm need to be controlled within a certain range. In some embodiments, a value of a ratio of the thickness of the first diaphragm to the thickness of the second diaphragm may be within a range of 0.5-100. In some embodiments, a value of a ratio of the thickness of the first diaphragm to the thickness of the second diaphragm may be within a range of 0.75-75. In some embodiments, a value of a ratio of the thickness of the first diaphragm to the thickness of the second diaphragm may be within a range of 1-50. In some embodiments, a value of the thickness of the first diaphragm may be within a range of 200 nm-10 μm. In some embodiments, a value of the thickness of the first diaphragm may be within a range of 300 nm-5 μm. In some embodiments, a value of the thickness of the first diaphragm may be within a range of 500 nm-2 μm. In some embodiments, a value of the thickness of the second diaphragm may be within a range of 200 nm-100 μm. In some embodiments, a value of the thickness of the second diaphragm may be within a range of 300 nm-75 μm. In some embodiments, a value of the thickness of the second diaphragm may be within a range of 500 nm-50 μm.

In some embodiments, the second diaphragm may not be necessary and the through-hole may be covered by a member (a sheet member, a block member, etc.) made of other materials having a lower Young's modulus than that of the first diaphragm, which also ensures the air tightness while reducing the overall equivalent stiffness k of the diaphragm 122.

Figure 10:
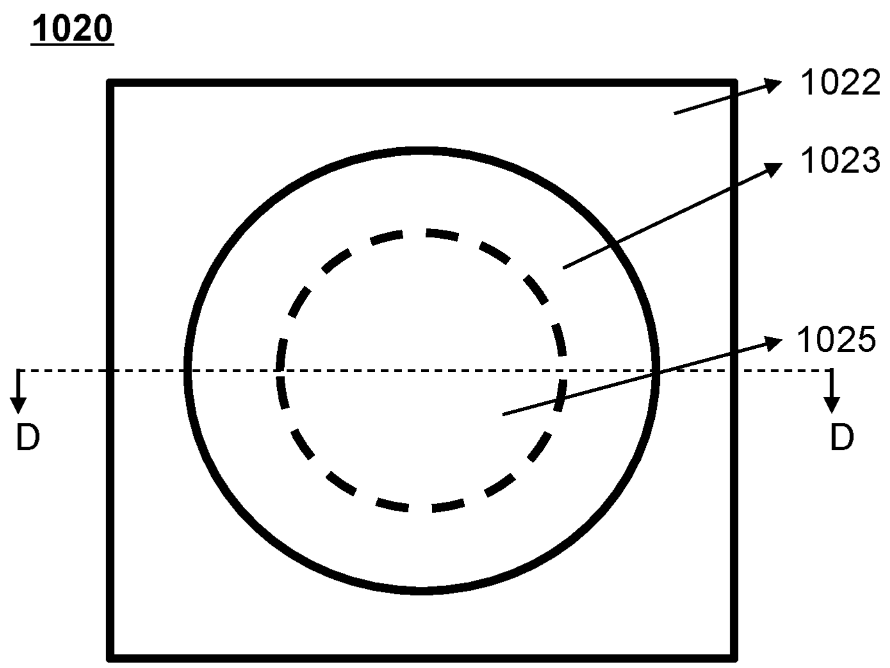
FIG. 10 is a schematic diagram illustrating an exemplary acoustoelectric transducer according to some further embodiments of the present disclosure.
Figure 11:
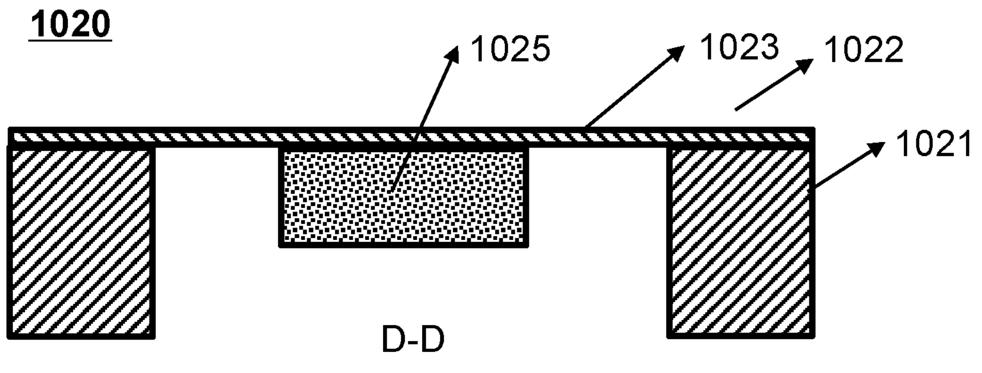
FIG. 11 is a schematic diagram illustrating a D-D section shown in FIG. 10.

In some embodiments, the acoustoelectric transducer 120 may include a mass component connected to the diaphragm 122 (e.g., the mass component 1025 in FIG. 10 or FIG. 11). In some cases, by providing the mass component, a mass change in the resonant system formed by the acoustoelectric transducer 120 is greater than a stiffness change, such that the equivalent mass m of the acoustoelectric transducer 120 is increased, and the second resonant frequency $f_2$ of the acoustoelectric transducer 120 is decreased.

Figure 12:
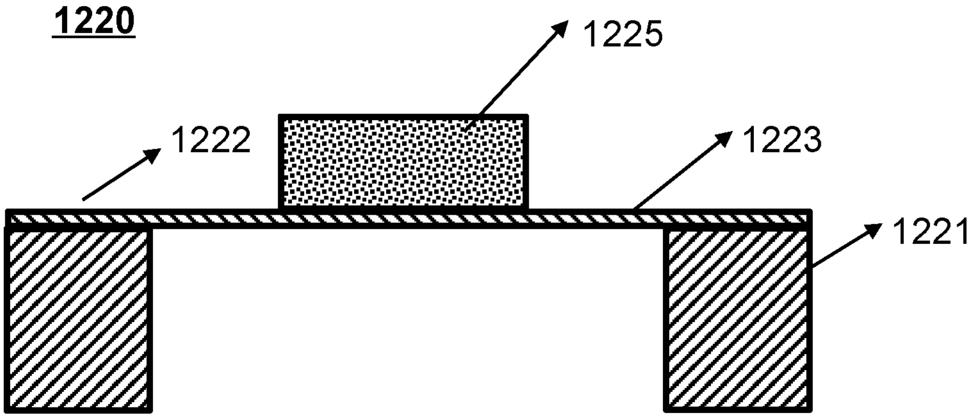
FIG. 12 is a schematic diagram illustrating a cross-section of an exemplary acoustoelectric transducer according to some other embodiments of the present disclosure.

In some embodiments, the mass component may be connected to the diaphragm 122, and the mass component is arranged in a vibration direction of the diaphragm 122 (i.e., perpendicular to a plane of the diaphragm 122). In some embodiments, a projection of the mass component may be located within a projection of the diaphragm 122. In some embodiments, the mass component may be provided on the upper surface of the diaphragm 122 or the lower surface of the diaphragm 122. As shown in FIG. 11 and FIG. 12, a mass component 1025 and a mass component 1125 are provided on the lower surface of the diaphragm 1022 and the upper surface of the diaphragm 1122, respectively. In some embodiments, at least one mass component is provided at the center of the diaphragm 122. The center refers to a location where a distance between the center and an edge of the diaphragm 122 is greater than or equal to a preset distance. In some embodiments, a distance between a centerline of the mass component and a centerline of the diaphragm 122 is greater than or equal to a distance between the centerline of the mass component and the edge of the diaphragm 122.

In some embodiments, a count of mass components may be one, two, or more than two. Exemplarily, in the embodiments shown in FIG. 10-FIG. 13, the count of mass components is one. In some other embodiments, the count of mass components may be two or more. Where the mass components are two or more, the shape, the dimension, and/or the material of each mass component may be the same or different. In some embodiments, to prevent an excessive stress concentration at a corner point caused by non-smooth curves, the embodiments of the present disclosure choose the projection of the diaphragm 122 in the thickness direction to be circular.

In some embodiments, the mass component may be any member that is easily to be produced, including but is not limited to, a column member, a block member, a strip member, a rod member, a sheet member, a spherical member, etc. In some specific embodiments, the mass component may be a counterweight block. The counterweight block may be of different dimensions for easy replacement to provide different masses. In some embodiments, a shape of the projection of the counterweight block along the vibration direction perpendicular to the diaphragm 122 may include, but is not limited to, a triangle, a rectangle, a trapezoid, an inverted trapezoid, a circle, etc. Exemplarily, in the embodiment shown in FIG. 10-FIG. 13, the shape of the projection of the counterweight block along the vibration direction perpendicular to the diaphragm 122 may be circular.

In some embodiments, when the acoustoelectric transducer 120 receives an air vibration signal, the mass component may vibrate in response to the air vibration signal. In some embodiments, when the acoustoelectric transducer 120 is applied to a vibration sensor or microphone (e.g., the microphone 100), the material density of the mass component has a large effect on the resonant peak and sensitivity of the frequency response curve of the vibration sensor or microphone. For example, in the case of the same volume, the greater the density of the mass component, the greater the mass of the mass component, the more the resonant peak of the vibration sensor or microphone shifts toward a lower frequency, which can increase the low frequency sensitivity of the vibration sensor or the microphone. In some embodiments, the material of the mass component may be a material having a density greater than a certain density threshold (e.g., 6 $g/cm^3$). In some embodiments, a value of the material density of the mass component may be within a range of 6 $g/cm^3$-20 $g/cm^3$. In some embodiments, a value of the material density of the mass component may be within a range of 6 $g/cm^3$-15 $g/cm^3$. In some embodiments, a value of the material density of the mass component may be within a range of 6 g/cm$^3$-10 g/cm$^3$. In some embodiments, a value of the material density of the mass component may be within a range of 6 g/cm$^3$-8 g/cm$^3$. In some embodiments, the material of the mass component may be a metallic material or a non-metallic material. Exemplary metallic materials may include, but are not limited to, steel (e.g., stainless steel, carbon steel, etc.), lightweight alloy (e.g., aluminum alloy, beryllium copper, magnesium alloy, titanium alloy, etc.), etc., or any combination thereof. Exemplary non-metallic materials may include, but are not limited to, polyurethane foam, glass fiber, carbon fiber, graphite fiber, silicon carbide fiber, silicon, silicon oxide, silicon nitride, and the like.

Similarly, the dimension of the mass component may affect the volume and the performance of the acoustoelectric transducer 120 and needs to be similarly controlled. For ease of description, the mass component of the present disclosure may be a cylindrical member. In some embodiments, a value of a ratio of a radius of the diaphragm 122 to a radius of the mass component may be within a range of 0.8-10. In some embodiments, a value of a ratio of the radius of the diaphragm 122 to the radius of the mass component may be within a range of 1-7.5. In some embodiments, a value of a ratio of the radius of the diaphragm 122 to the radius of the mass component may be within a range of 1.2-5. In some embodiments, a value of the radius of the diaphragm 122 may be within a range of 100 μm-2500 μm. In some embodiments, a value of the radius of the diaphragm 122 may be within a range of 200 μm-2000 μm. In some embodiments, a value of the radius of the diaphragm 122 may be within a range of 300 μm-1500 μm. In some embodiments, a value of the radius of the mass component may be within a range of 10 μm-3125 μm. In some embodiments, a value of the radius of the mass component may be within a range of 27 μm-2000 μm. In some embodiments, a value of the radius of the mass component may be within a range of 60 μm-1250 μm.

In some embodiments, the mass component may be combined with the diaphragm 122 including the first region 1231 and the second region 1232 in the foregoing embodiments. For example, the transducer region 123 of the diaphragm 122 includes the first region 1231 and the second region 1232, and the mass component may be provided in the first region 1231 and/or the second region 1232. In some cases, by setting the transducer region 123 as the first region 1231 and the second region 1232 having different Young's moduli and disposing the mass component in the first region 1231 and/or the second region 1232, the equivalent stiffness k and equivalent mass m of the acoustoelectric transducer may be adjusted while increasing the reduction degree of the second resonant frequency $f_2$. In some embodiments, the mass component may be combined with the diaphragm 122 provided with the through-hole in the foregoing embodiments. For example, the diaphragm 122 includes a first diaphragm provided with the through-hole and a second diaphragm provided on the upper surface of the first diaphragm and covering the upper surface of the first diaphragm, and the mass component may be provided on the lower surface of the first diaphragm and/or on one side of the second diaphragm away from the first diaphragm.

In some embodiments, the acoustoelectric transducer 120 may be applied to a vibration sensor or a microphone (e.g., the microphone 100). Exemplarily, the acoustoelectric transducer 120 may be applied to the microphone to convert a received sound signal into an electrical signal through its transducer region 123. In some embodiments, the microphone may include a capacitive microphone, a piezoelectric microphone, a piezoresistive microphone, etc. In some embodiments, the acoustoelectric transducer 120 may also be applied to a capacitive microphone. At this time, the acoustoelectric transducer 120 further includes a backplate 124, the circumferential side of the backplate 124 is embedded in the substrate 121, and an angle formed by the backplate 124 and the diaphragm 122 within a preset angle range. In some embodiments, a value of the preset angle range may be within a range of 0 degrees to 5 degrees. In some embodiments, a value of the preset angle range may be within a range of 0 degrees to 2 degrees. In some embodiments, the backplate 124 and the diaphragm 122 may be parallel to each other. The diaphragm 122 and the backplate 124 form a parallel plate capacitor structure. When the diaphragm 122 senses an external audio sound pressure signal, a distance between the diaphragm 122 and the backplate 124 changes, which changes a capacitance capacity and a voltage, and then the capacitance change is converted into a change of a voltage signal by the application-specific integrated circuit 150 and output by the application-specific integrated circuit 150.

In some embodiments, the acoustic structure 130 may include the acoustic cavity 131 and a sound guiding tube 132. In some embodiments, the acoustic structure 130 may be communicated with the outside of the microphone 100 through the sound guiding tube 132. In some embodiments, the sound guiding tube 132 may be provided on the cavity wall forming the acoustic cavity 131. Exemplarily, taking the microphone 1400 shown in FIG. 14 as an example, a sound guiding tube 1432 may be provided on a cavity wall 1411. As another example, a first end of the sound guiding tube 1432 may be located on the cavity wall (e.g., the cavity wall 1411) forming the acoustic cavity 1431, and a second end of the sound guiding tube 1432 may extend to the outside of the housing 1410. As another example, the first end of the sound guiding tube 1432 may be disposed on the cavity wall (e.g., the cavity wall 1411) forming the acoustic cavity 1431, and the second end of the sound guiding tube 1432 may extend into the acoustic cavity 1431. The external sound signal may be transmitted to the acoustic cavity 1431 through the sound guiding tube 1432.

In some embodiments, the dimension, the shape, the location, and other parameters of the sound guiding tube 132 may be set according to practical needs, for example, a desired resonant frequency of the acoustic structure 130 (which can also be referred to as the first resonant frequency). The shape of the sound guiding tube 132 may include a regular shape and/or an irregular shape such as rectangular, cylindrical, multi-prismatic, etc. In some embodiments, the structure of the sound guiding tube 132 may be a variable diameter structure. For example, one or more side walls of the sound guiding tube 132 may form an inclination angle with a central axis of the sound guiding tube 132, such that a tube diameter of the first end of the sound guiding tube 132 is different from a tube diameter of the second end of the sound guiding tube 132.

In some embodiments, the acoustic structure 130 may have a first resonant frequency, i.e., a frequency component of the sound signal at the first resonant frequency resonates within the acoustic structure 130, thereby increasing the volume of that frequency component transmitted to the acoustoelectric transducer 120. Therefore, an arrangement of the acoustic structure 130 may make the frequency response curve of the microphone 100 produce a resonant peak at the first resonant frequency, thereby increasing the sensitivity of the microphone 100 in a certain frequency band containing the first resonant frequency. In some embodiments, the first resonant frequency is related to one or more structural parameters of the acoustic structure 130. In some embodiments, the one or more structural parameters of the acoustic structure 130 may include, but are not limited to, the shape of the sound guiding tube 132, the dimension of the sound guiding tube 132, the dimension of the acoustic cavity 131, the acoustic resistance of the sound guiding tube 132 or the acoustic resistance of the acoustic cavity 131 (if any), a roughness of the inner surface of the side wall of the sound guiding tube 132, the thickness of a sound absorbing material in the sound guiding tube 132 (if any), the stiffness of the inner wall of the acoustic cavity 131, etc., or a combination thereof. In some embodiments, by setting the one or more structural parameters of the acoustic structure 130, the sound signal adjusted by the acoustic structure 130 may have a resonant peak at the first resonant frequency after being converted into the electrical signal.

In some embodiments, when sound waves propagate in the acoustic structure 130, if the radius of the sound guiding tube 132 is relatively large or the frequency of the sound waves is relatively low, it can be assumed that there is no acoustic impedance when the sound waves propagate in the acoustic structure 130, so there is no thermal loss. However, in other embodiments, when the radius of the sound guiding tube 132 is relatively small or the frequency of the sound waves is relatively high, the tube wall of the sound guiding tube 132 has an effect on the movement of a mass point of a medium (for example, a sound propagates in air, which means that the air is the medium of the sound, and a certain point in the air is the mass point of the medium), and this effect causes the thermal loss during the transmission of the sound waves.

In some embodiments, when a value of the radius of the sound guiding tube 132 is within a range of 0.005 mm-0.5 mm, the sound guiding tube 132 having the radius that meets this condition may be referred to as a microporous tube. The acoustic impedance of the sound waves propagating in the microporous tube is relatively large, and its acoustic impedance may be calculated by the following equation:

$$Z_a \approx \frac{8\eta l}{\pi a^4}\sqrt{1+\frac{|Ka|^2}{32}} + j\frac{\omega\rho_0 l}{\pi a^2}\left[1+\frac{1}{\sqrt{3^2+\frac{|Ka|^2}{2}}}\right], \tag{6}$$

where $Z_a$ denotes the acoustic impedance; a denotes the radius of the sound guiding tube 132; $\eta$ denotes a shear viscosity coefficient of the fluid; $\rho_0$ denotes a density of the medium; l denotes the length of the sound guiding tube 132; j denotes a complex number; and K denotes an artificially defined quantity. In some embodiments, the artificially defined quantity K may be calculated by the following equation:

$$K^2 = -j\frac{\rho_0\omega}{\eta}, \tag{7}$$

where $\omega$ denotes an angular frequency of the sound waves.

In some embodiments, it can be known from equation (6) and equation (7) that when the sound guiding tube 132 is a microporous tube, the acoustic resistance in the acoustic impedance is inversely proportional to the fourth power of the radius of the sound guiding tube 132, and the acoustic reactance in the acoustic impedance is inversely proportional to a square of the radius of the sound guiding tube 132. The overall acoustic impedance increases exponentially as the radius of the sound guiding tube 132 decreases. At the same time, the acoustic impedance is linearly inversely related to the length of the sound guiding tube 132.

Based on the above reasons, in some embodiments, the thermal loss of the sound waves during propagation is decreased by increasing the length of the sound guiding tube 132 and/or increasing the radius of the sound guiding tube 132, thereby achieving the purpose of significantly increasing the sensitivity of the acoustic structure 130 to the sound signal.

In some embodiments, a shape of a cross-section of the sound guiding tube 132 along its length direction may include, but is not limited to, the circle, the rectangle, the triangle, the trapezoid, etc. In specific embodiments of the present disclosure, the shape of the cross-section of the sound guiding tube 132 may be circular.

In some embodiments, a value of an inner diameter of the sound guiding tube 132 may be within a range of 0.1 mm-3 mm. The inner diameter refers the diameter of the sound guiding tube 132. In some embodiments, a value of an inner diameter of the sound guiding tube 132 may be within a range of 0.2 mm-2 mm. In some embodiments, a value of an inner diameter of the sound guiding tube 132 may be within a range of 0.3 mm-1 mm.

In some embodiments, a value of the length of the sound guiding tube 132 may be within a range of 1 mm-4 mm. In some embodiments, a value of the length of the sound guiding tube 132 may be within a range of 1 mm-3 mm. In some embodiments, a value of the length of the sound guiding tube 132 may be within a range of 1 mm-2 mm. In some embodiments, a value of the length of the sound guiding tube 132 may be within a range of 1 mm-1.5 mm.

In some embodiments, a ratio of the inner diameter of the sound guiding tube 132 to the length of the sound guiding tube 132 is not greater than 1.5. In some embodiments, a ratio of the inner diameter of the sound guiding tube 132 to the length of the sound guiding tube 132 is not greater than 1.2. In some embodiments, a ratio of the inner diameter of the sound guiding tube 132 to the length of the sound guiding tube 132 is not greater than 1. In some embodiments, a ratio of the inner diameter of the sound guiding tube 132 to the length of the sound guiding tube 132 is not greater than 0.5.

In some embodiments, the shape of the cross-section of the acoustic cavity 131 along its thickness direction may include, but is not limited to, the circle, the rectangle, the trapezoid, the triangle, the polygon, etc. In the present disclosure embodiment, the shape of the acoustic cavity 131 may be circular or square.

In some embodiments, the inner diameter of the acoustic cavity 131 and the thickness of the acoustic cavity 131 may also have an effect on the performance of the acoustic structure 130.

In some embodiments, a value of an equivalent (volume-equivalent) inner diameter of the acoustic cavity 131 may be within a range of 1 mm-6 mm. The equivalent inner diameter may refer to an inner diameter of the acoustic cavity having the same cavity volume as the acoustic cavity and having a circular cross-section along its thickness direction. In some embodiments, a value of the equivalent inner diameter of the acoustic cavity 131 is within a range of 1 mm-5 mm. In some embodiments, a value of the equivalent inner diameter of the acoustic cavity 131 is within a range of 1 mm-4 mm. In some embodiments, a value of the equivalent inner diameter of the acoustic cavity 131 is within a range of 1 mm-3 mm.

In some embodiments, a value of the thickness of the acoustic cavity 131 is within a range of 1 mm-4 mm. In some embodiments, a value of the thickness of the acoustic cavity 131 is within a range of 1 mm-3 mm. In some embodiments, a value of the thickness of the acoustic cavity 131 is within a range of 1 mm-2 mm. In some embodiments, a value of the thickness of the acoustic cavity 131 is within a range of 1 mm-1.5 mm.

In some embodiments, a ratio of the equivalent inner diameter of the acoustic cavity 131 to the thickness of the acoustic cavity 131 is greater than or equal to 1. In some embodiments, a ratio of the equivalent inner diameter of the acoustic cavity 131 to the thickness of the acoustic cavity 131 is greater than or equal to 1.5. In some embodiments, a ratio of the equivalent inner diameter of the acoustic cavity 131 to the thickness of the acoustic cavity 131 is greater than or equal to 2.

In some embodiments, the first resonant frequency of the acoustic structure 130 may be the same as or different form the second resonant frequency of the acoustoelectric transducer 120 (e.g., the second resonant frequency $f_2$). For example, the first resonant frequency may be less than the second resonant frequency. In this case, the sensitivity of the microphone 100 may be improved in a relatively low frequency range by setting the first resonant frequency introduced by the acoustic structure 130. As another example, the first resonant frequency may be greater than the second resonant frequency. In this case, the sensitivity of the microphone 100 may be improved in a relatively high frequency range by setting the first resonant frequency introduced by the acoustic structure 130. As another example, an absolute value of the difference between the first resonant frequency and the second resonant frequency is not greater than a frequency threshold. In some embodiments, the frequency threshold may be set according to practical needs. For example, a frequency threshold may be 1000 Hz, 500 Hz, 200 Hz, 100 Hz, etc. In this case, resonant peaks of the microphone 100 at the first resonant frequency and the second resonant frequency may be improved, thereby achieving an output of two resonant peaks having high Q values (Q value is a quality factor) by using one microphone 100. As another example, the first resonant frequency may be equal to the second resonant frequency. In this case, the microphone 100 may produce two resonances at the first resonant frequency/second resonant frequency, thereby increasing the sensitivity of the microphone 100 at the resonant peaks, so that the electrical signal produced by the microphone 100 has resonant peaks having a higher Q value. Details regarding the first resonant frequency and the second resonant frequency may be found in FIG. 16 and FIG. 17 and their related descriptions.

In some embodiments, the microphone 100 may include a plurality of acoustic structures 130, and the plurality of acoustic structures 130 may be provided in parallel, in series, or a combination thereof. In some embodiments, the plurality of acoustic structures 130 of the microphone 100 may have the same or different first resonant frequencies. When the plurality of acoustic structures 130 of the microphone 100 have the same first resonant frequency, the Q value and the sensitivity of the microphone 100 at the first resonant frequency may be improved by providing the acoustic structures 130 of the microphone 100. When the plurality of acoustic structures 130 in microphone 100 have different first resonant frequencies, the sensitivity of the microphone 100 at a relatively wide frequency range may be improved by providing the acoustic structures 130 of the microphone 100.

The application-specific integrated circuit 150 may obtain the electrical signal from the acoustoelectric transducer 120 and perform a signal processing on the electrical signal. In some embodiments, the application-specific integrated circuit 150 may be directly connected to the acoustoelectric transducer 120 through wires (e.g., gold wires, copper wires, aluminum wires, etc.). In some embodiments, the signal processing may include a frequency modulation processing, an amplitude modulation processing, a filtering processing, a noise reduction processing, etc.

The descriptions of the above microphone 100 are merely provided for the purpose of description, and are not intended to limit the scope of the present disclosure. For those skilled in the art, various amendments and variations may be made. These amendments and variations remain within the scope of the protection of the present disclosure.

FIG. 3 is a schematic diagram illustrating an exemplary acoustoelectric transducer according to some embodiments of the present disclosure. FIG. 4 is a schematic diagram of an A-A cross-section in FIG. 3. As shown in FIG. 3 and FIG. 4, an acoustoelectric transducer 320 may include a substrate 321 and a diaphragm 322. The circumferential side of the diaphragm 322 is connected to the substrate 321 through a physical manner including, but is not limited to, adhesive bonding, welding, riveting, screw fastening, integral molding, etc.

In some embodiments, the substrate 321 may be a frame structure having a hollow cavity, and the circumference side of the diaphragm 322 is connected to the side wall of the hollow cavity. For example, in FIG. 4, the substrate 321 is a rectangular frame having a cylindrical hollow cavity, the diaphragm 322 is a rectangular membrane structure, and the circumference side of the diaphragm 322 is connected to the rectangular frame. In some embodiments, the diaphragm 322 and the substrate 321 may define a transducer region 323. As shown in FIG. 4, a portion of the diaphragm 322 that is not connected to the substrate 321, i.e., a portion of the diaphragm 322 that is located within the hollow cavity, may be determined as the transducer region 323, and the shape of the transducer region is circular.

In some embodiments, the transducer region 323 includes a first region 3231 and a second region 3232. The shape of the first region 3231 is circular and the shape of the second region 3232 is annular. The second region 3232 surrounds the circumference side of the first region 3231. In some embodiments, the Young's modulus of the first region 3231 is greater than the Young's modulus of the second region 3232. A value of the Young's modulus of the first region 3231 and a value of the Young's modulus of the second region 3232 may be found in the description of other embodiments of the present disclosure.

Figure 5:
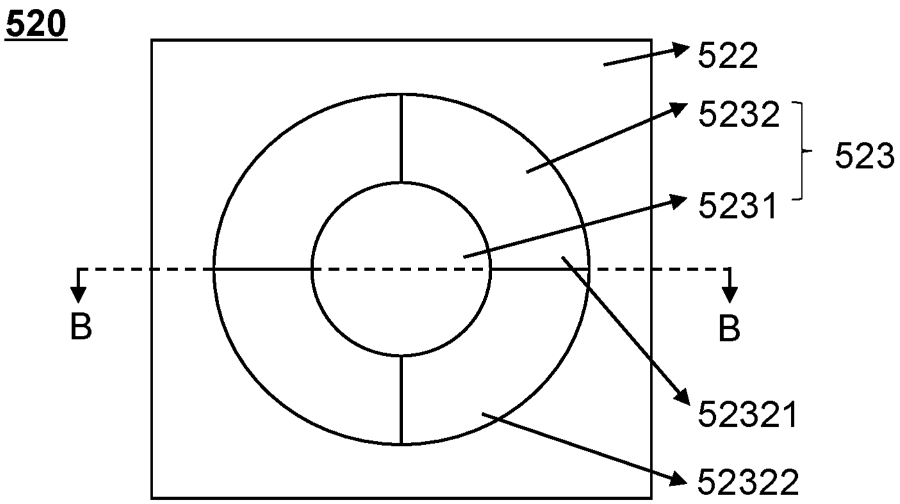
FIG. 5 is a schematic diagram illustrating an exemplary acoustoelectric transducer according to some other embodiments of the present disclosure.
Figure 6:
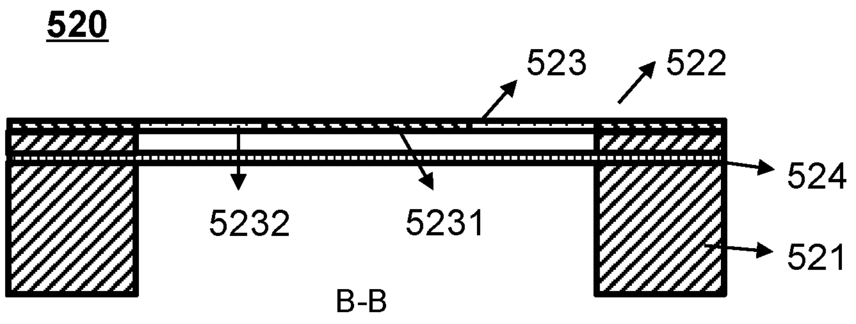
FIG. 6 is a schematic diagram illustrating a B-B section shown in FIG. 5.

FIG. 5 is a schematic diagram illustrating an exemplary acoustoelectric transducer according to some other embodiments of the present disclosure. FIG. 6 is a schematic diagram illustrating a B-B cross-section shown in FIG. 5. As shown in FIGS. 5 and 6, an acoustoelectric transducer 520 may include a substrate 521, a diaphragm 522, and a backplate 524.

The substrate 521 in the acoustoelectric transducer 520 shown in FIG. 5 and FIG. 6 may be the same as or similar to the substrate 321 of the acoustoelectric transducer 320 shown in FIG. 3 and FIG. 4. For example, the substrate 521 of the acoustoelectric transducer 520 and a first region 5231 of the acoustoelectric transducer 520 is the same as or similar to the substrate 321 of the acoustoelectric transducer 320 and the first region 3231 of the acoustoelectric transducer 320. Differently, the acoustoelectric transducer 320 may be applied to a piezoelectric microphone or a piezoresistive microphone. However, the acoustoelectric transducer 520 further includes the backplate 524, so the acoustoelectric transducer 520 may be applied to a capacitive microphone. The circumferential side of the backplate 524 is embedded in a frame of the substrate 521, and the backplate 524 is located on one side close to a lower surface of the diaphragm 522.

In addition, in some embodiments, the diaphragm 522 and the substrate 521 of the acoustoelectric transducer 520 define a transducer region 523 (the transducer region 523 is a portion of the diaphragm 522). The transducer region 523 may include a first region 5231 and a second region 5232. The first region 5231 is the same as or similar to the first region 5231 in FIG. 4. The second region 5232 may further include a third sub-region 52321 and a fourth sub-region 52322. The third sub-region 52321 and the fourth sub-region 52322 respectively have the different Young's moduli. In some embodiments, the Young's modulus of the third sub-region 52321 may be greater than the Young's modulus of the fourth sub-region 52322. In some embodiments, the shape of the first region 5231 is circular and the shape of the second region 5232 is annular. The shape of the third sub-region 52321 and the shape of the fourth sub-region 52322 are both fan-shaped annular, and a count of the third sub-regions 52321 and a count of the fourth sub-region 52322*s* both are two, and the third sub-regions 52321 and the fourth sub-regions 52322 are spaced apart from each other to form the second region 5232 in an annular shape.

Figure 7:
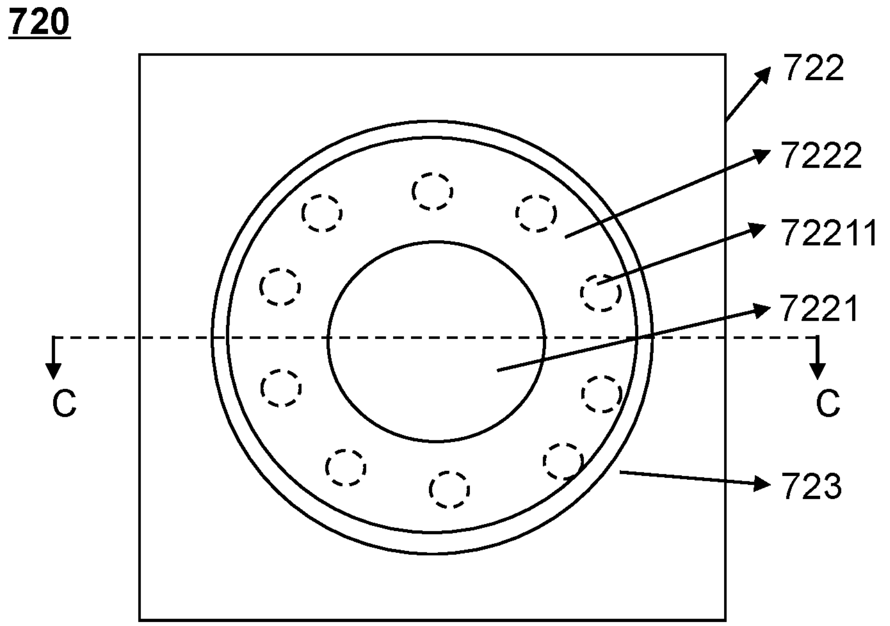
FIG. 7 is a schematic diagram illustrating an exemplary acoustoelectric transducer according to some further embodiments of the present disclosure.
Figure 9:
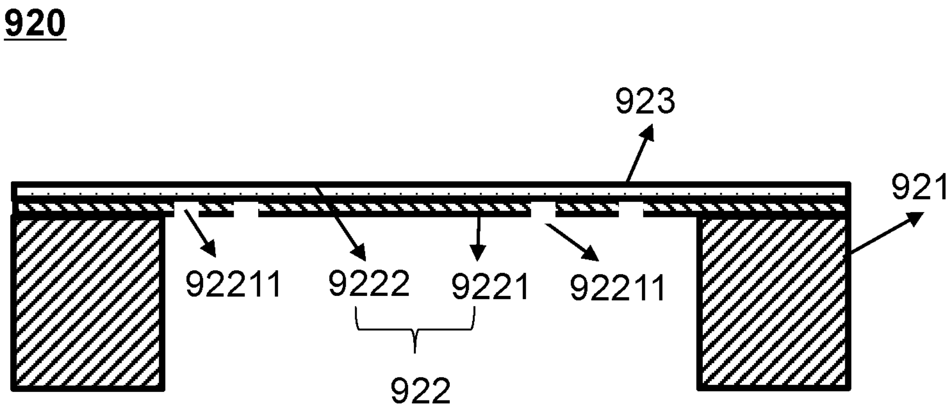
FIG. 9 is a schematic diagram illustrating a cross-section of an exemplary acoustoelectric transducer according to some embodiments of the present disclosure.

FIG. 7 is a schematic diagram illustrating an exemplary acoustoelectric transducer according to some further embodiments of the present disclosure. FIG. 8 is a schematic diagram illustrating a C-C cross-section shown in FIG. 7. FIG. 9 is a schematic diagram illustrating a cross-section of an exemplary acoustoelectric transducer according to some embodiments of the present disclosure. As shown in FIGS. 7 and 8, an acoustoelectric transducer 720 may include a substrate 721 and a diaphragm 722 connected to the substrate 721.

The substrate 721 in the acoustoelectric transducer 720 shown in FIG. 7 and FIG. 8 may be the same as or similar to the substrate 321 in the acoustoelectric transducer shown in FIG. 3 and FIG. 4. Differently, the diaphragm 722 of the acoustoelectric transducer 720 includes a first diaphragm 7221 and a second diaphragm 7222. The Young's modulus of the first diaphragm 7221 is greater than the Young's modulus of the second diaphragm 7222. The first diaphragm 7221 is provided with one or more through-holes 72211, and the second diaphragm 7222 is provided on the upper surface of the first diaphragm 7221 and covers the through-hole(s) 72211. In some cases, the through-hole(s) 72211 may be provided on the first diaphragm 7221 having the relatively large Young's modulus, which may decrease the stiffness of the first diaphragm 7221, thereby reducing the equivalent stiffness of the acoustoelectric transducer 720 and reducing the second resonant frequency of the acoustoelectric transducer 720. In addition, in some cases, covering the through-hole 72211 with the second diaphragm 7222 having a relatively small Young's modulus can ensure the airtightness of the acoustoelectric transducer 720 and assist in adjusting the second resonant frequency of the acoustoelectric transducer 720.

In some embodiments, the shape of the transducer region 723 of the first diaphragm 7221 is circular, and a count of through-holes 72211 is ten. The ten through-holes 72211 are provided around the center of the first diaphragm 7221, which may also be understood to be provided around the circumference of the transducer region 723. In some embodiments, hole diameters of all the through-holes 72211 may have the same or different diameters. In the present embodiment, all the through-holes 72211 have the same hole diameter. In some embodiments, the shape of the second diaphragm 7222 may be annular, and the annular second diaphragm 7222 may be provided on the first diaphragm 7221 to cover all through-holes 7221 at the same time.

In other embodiments, the second diaphragm may cover the entire upper surface of the first diaphragm. FIG. 9 illustrates another form of the arrangement of the diaphragm 921. In some embodiments, an acoustoelectric transducer 920 may include a substrate 921 and a diaphragm 922 connected to the substrate 921.

The substrate 921, a first diaphragm 9221, a transducer region 923, and through-hole(s) 92211 provided on the first diaphragm 9221 of the acoustoelectric transducer 920 shown in FIG. 9 may be the same or similar to the substrate 721, the first diaphragm 7221, the transducer region 723, and the through-hole 72211 of the acoustoelectric transducer shown in FIG. 7 and FIG. 8. Differently, the first diaphragm 9221 of the acoustoelectric transducer 920 and a second diaphragm 9222 of the acoustoelectric transducer 920 are both rectangular, and the length and the width of the second diaphragm 9222 is the same or approximately same as the length and the width of the first diaphragm 9221, so that the second diaphragm 9222 may cover the entire upper surface of the first diaphragm 9221. In some embodiments, the first diaphragm 9221 may be connected to the second diaphragm 9222 in a physical manner. The manner of connection includes, but is not limited to, welding, adhesive bonding, riveting, and integral molding.

FIG. 10 is a schematic diagram illustrating an exemplary acoustoelectric transducer according to some further embodiments of the present disclosure. FIG. 11 is a schematic diagram illustrating a D-D cross-section shown in FIG. 10. FIG. 12 is a schematic diagram illustrating a cross-section of an exemplary acoustoelectric transducer according to some further embodiments of the present disclosure. As shown in FIG. 10 and FIG. 0.11, an acoustoelectric transducer 1020 may include a substrate 1021, a diaphragm 1022, and a mass component 1025 (e.g., a counterweight block). The circumferential side of the diaphragm 1022 is connected to the substrate 1021 and forms a transducer region 1023 with the substrate 1021. The mass component 1025 is provided in the transducer region 1023 of the substrate 1021. In some cases, the resonant frequency of the acoustoelectric transducer 1020 may be effectively reduced by providing the mass component 1025 on the diaphragm 1022 to increase the equivalent mass of the acoustoelectric transducer 1020. In some cases, the equivalent mass of the acoustoelectric transducer 1020 may be adjusted by replacing the mass component 1025 of different weights, so that the resonant frequency of the acoustoelectric transducer 1020 reaches a target frequency.

As shown in FIG. 10 and FIG. 11, the shape of the transducer region 1023 defined by the substrate 1021 and the diaphragm 1022 is circular. The shape of the projection of the mass component 1025 along the thickness direction of the diaphragm 1022 is also circular, and centers of the two circles coincide. In some embodiments, the mass component 1025 may be provided on the upper surface or the lower surface of the diaphragm 1022. For example, in the embodiment shown in FIG. 10 and FIG. 11, the mass component 1025 is provided on the lower surface of the diaphragm 1022. Also, for example, in the embodiment shown in FIG. 12, the mass component 1225 is provided on the upper surface of the diaphragm 1222. In some embodiments, the mass component 1025 and the diaphragm 1022 may be connected through a physical manner including, but is not limited to, adhesive bonding, welding, riveting, screw fastening, integral molding, etc.

The acoustoelectric transducer (the acoustoelectric transducer 1020, the acoustoelectric transducer 1220) shown in FIG. 10-FIG. 12 may be the same as or similar to the acoustoelectric transducer 320 shown in FIG. 3 and FIG. 4. For example, the substrate (the substrate 1021 shown in FIGS. 10 and 11, the substrate 1221 shown in FIG. 12), the diaphragm (the diaphragm 1022 shown in FIG. 10 and FIG. 11, the diaphragm 1222 shown in FIG. 12), etc., of the acoustoelectric transducer (the acoustoelectric transducer 1020 shown in FIG. 10 and FIG. 11, the acoustoelectric transducer 1220 shown in FIG. 12) may be the same as or similar to the substrate 321, the diaphragm 322, etc., of the acoustoelectric transducer 320, respectively, which will not be described herein. Differently, the transducer region defined by the diaphragm and the substrate (the transducer region 1023 shown in FIG. 10 and FIG. 11, the transducer region 1223 shown in FIG. 12) does not differentiate the first region (the first region 3231 shown in FIG. 3 and FIG. 4) and the second region (the second region 3232 shown in FIG. 3 and FIG. 4).

Figure 13:
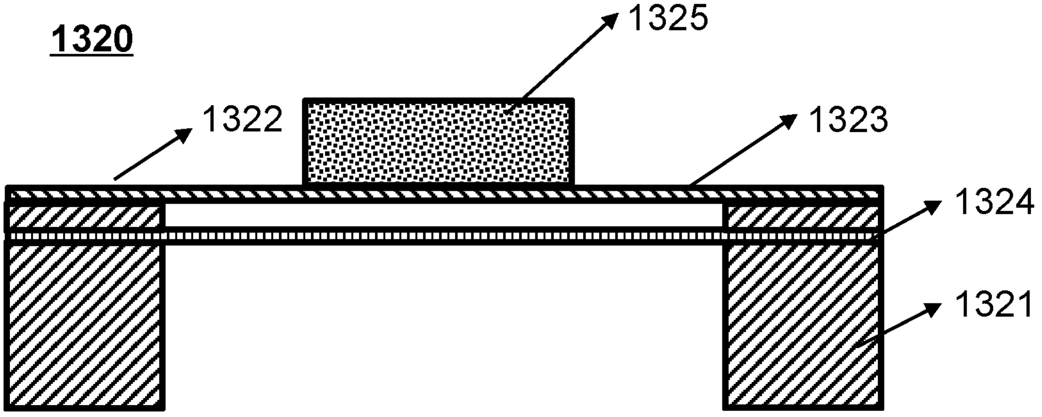
FIG. 13 is a schematic diagram illustrating a cross-section of an exemplary acoustoelectric transducer according to some further embodiments of the present disclosure.

FIG. 13 is a schematic diagram illustrating a cross-section of an exemplary acoustoelectric transducer according to some further embodiments of the present disclosure. As shown in FIG. 13, an acoustoelectric transducer 1320 may include a substrate 1321, a diaphragm 1322, a mass component 1325, and a backplate 1324. A circumferential side of the diaphragm 1322 is connected to the substrate 1321 and forms a transducer region 1323 with the substrate 1321. The mass component 1325 is provided in the transducer region 1323 of the substrate 1321. The substrate 1321 of the acoustoelectric transducer 1320 shown in FIG. 13 may be the same as or similar to the substrate 1221 of the acoustoelectric transducer 1220 shown in FIG. 12. For example, the substrate 1321, the diaphragm 1322, the mass component 1325, etc., of the acoustoelectric transducer 1320 may be the same as or similar to the substrate 1221, the diaphragm 1222, the mass component 1225, etc., of the acoustoelectric transducer 1220, respectively, which not be described herein. Differently, the acoustoelectric transducer 1220 may be applied to a piezoelectric microphone or a piezoresistive microphone. However, the acoustoelectric transducer 1320 further includes the backplate 1324, so that the acoustoelectric transducer 1320 can be applied to a capacitive microphone. The circumferential side of the backplate 1324 is embedded in the frame of the substrate 1321, and the circumferential side of the backplate 1324 is embedded in the substrate 1321 and is provided on one side close to the lower surface of the diaphragm 1322.

Figure 14:
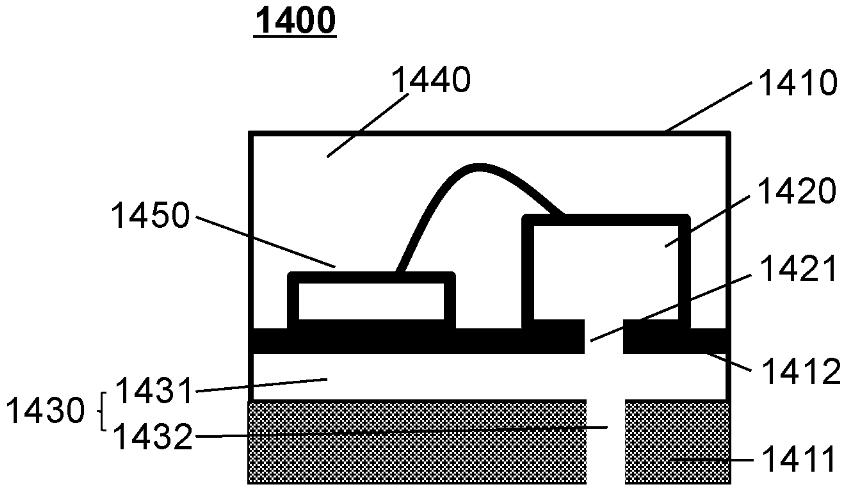
FIG. 14 is a schematic diagram illustrating an exemplary microphone according to some embodiments of the present disclosure.

FIG. 14 is a schematic diagram illustrating an exemplary microphone according to some embodiments of the present disclosure. As shown in FIG. 14, a microphone 1400 may include a housing 1410, a plate body 1412, an acoustic structure 1430, an acoustoelectric transducer 1420, and an application-specific integrated circuit 1450.

A circumferential side of the plate body 1412 is connected to an inner wall of the housing 1410, dividing the cavity formed by the housing 1410 into an acoustic cavity 1431 and a first cavity 1440. The acoustoelectric transducer 1420 is connected to the application-specific integrated circuit 1450 and both are accommodated in the first cavity 1440. In addition, a sound inlet 1421 is provided on the plate body 1412, and the sound inlet 1421 may be acoustically communicated with the acoustic cavity 1431 and the acoustoelectric transducer 1420, and transmit a sound signal adjusted by the acoustic structure 1430 to the acoustoelectric transducer 1420, which may pick up and convert the sound signal into an electrical signal.

The acoustic cavity 1431 may be a portion of the acoustic structure 1430. As shown in FIG. 14, the acoustic cavity 1431 and the first cavity 1440 are located on two sides of the plate body 1412. A cavity wall 1411, a portion of the housing 1410, and the plate body 1412 enclose to form the acoustic cavity 1431. In addition, a sound guiding tube 1432 is provided on the cavity wall 1411, which may be acoustically communicated with the outside of the microphone and the acoustic cavity 1431. The external sound signal may be transmitted to the acoustic cavity 1431 through the sound guiding tube 1432.

Figure 15:
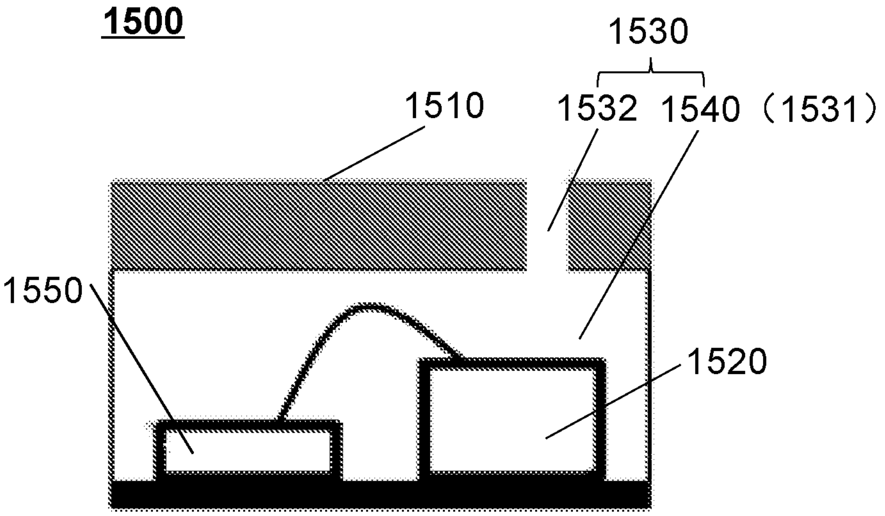
FIG. 15 is a schematic diagram illustrating an exemplary microphone according to some embodiments of the present disclosure.

FIG. 15 is a schematic diagram illustrating an exemplary microphone according to some embodiments of the present disclosure. As shown in FIG. 15, a microphone 1500 may include a housing 1510, an acoustic structure 1530, an acoustoelectric transducer 1520, and an application-specific integrated circuit 1550.

One or more components of the microphone 1500 shown in FIG. 15 may be the same as or similar to one or more components of the microphone 1400 shown in FIG. 14. For example, the housing 1510, the acoustoelectric transducer 1520, the acoustic structure 1530, the sound guiding tube 1532, the application-specific integrated circuit 1550, etc., of the microphone 1500 may be the same as or similar to the housing 1410, the acoustoelectric transducer 1420, the acoustic structure 1430, the sound guiding tube 1432, the application-specific integrated circuit 1450, etc., of the microphone 1400, respectively. Different from the microphone 1400, the acoustoelectric transducer 1520 and/or the application-specific integrated circuit 1550 of the microphone 1500 may be located in the acoustic cavity 1531 of the acoustic structure 1530.

In some embodiments, the acoustic structure 1530 may be directly acoustically communicated with the acoustoelectric transducer 1520. The direct acoustic communication between the acoustic structure 1530 and the acoustoelectric transducer 1520 may be understood as follows: the acoustoelectric transducer 1520 can include a "front cavity" and a "rear cavity," and the sound signal in the "front cavity" or "rear cavity" may cause a change in one or more parameters of the acoustoelectric transducer 1520. Exemplarily, in the microphone 1400 shown in FIG. 14, the sound signal passes through the acoustic structure 1430 (e.g., the sound guiding tube 1432 and the acoustic cavity 1431) and then is transmitted to the "rear cavity" of the acoustoelectric transducer 1420 through the sound inlet 1421 of the acoustoelectric transducer 1420, causing a change in one or more parameters of the acoustoelectric transducer 1420. As another example, in the microphone 1500 shown in FIG. 15, it can be considered that the first cavity 1540 formed by the housing 1510 coincides with the acoustic cavity 1531 of the acoustic structure 1530, and the "front cavity" of the acoustoelectric transducer 1520 coincides with the acoustic cavity 1531 of the acoustic structure, the sound signal passes through the acoustic structure 1530 directly, which causes the change in one or more parameters of the acoustoelectric transducer 1520.

Figure 16:
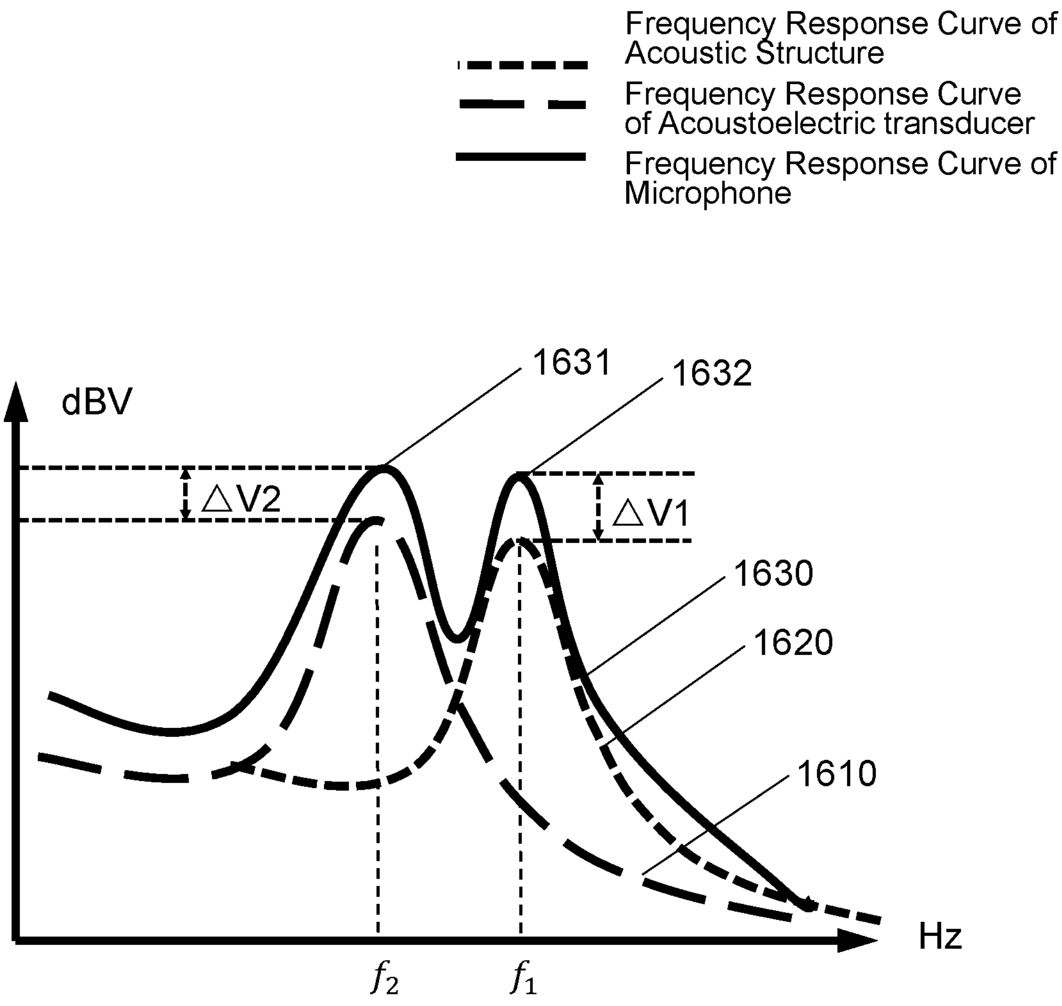
FIG. 16 is a schematic diagram illustrating frequency response curves of an exemplary microphone according to some embodiments of the present disclosure.

FIG. 16 is a schematic diagram illustrating frequency response curves of an exemplary microphone according to some embodiments of the present disclosure. As shown in FIG. 16, a frequency response curve 1610 represents a frequency response curve of an acoustoelectric transducer (e.g., the acoustoelectric transducer 1420), a frequency response curve 1620 represents a frequency response curve of an acoustic structure (e.g., the acoustic structure 1430), and a frequency response curve 1630 represents a frequency response curve of a microphone (e.g., the microphone 1400). At a frequency $f_2$, the acoustoelectric transducer resonates with the sound signal it receives, causing a frequency band signal containing the frequency $f_2$ to be amplified, the frequency response curve 1610 has a resonant peak at the frequency $f_2$, and the frequency $f_2$ may be referred to as the resonant frequency of the acoustoelectric transducer (i.e., the second resonant frequency). At the frequency $f_1$, the acoustic structure resonates with the received sound signal, causing a frequency band signal containing the frequency $f_1$ to be amplified, the frequency response curve 1620 at the frequency $f_1$ has a resonant peak, and the frequency $f_1$ may be referred to as the resonant frequency of the acoustic structure (i.e., the first resonant frequency).

In some embodiments, the range of the first resonant frequency and/or the second resonant frequency needs to be controlled so that the sound signal sent by the user may be received in the frequency range of the human voice. In some embodiments, the first resonant frequency and/or the second resonant frequency may be within a range of 10 Hz-20,000 Hz. In some embodiments, the first resonant frequency and/or the second resonant frequency may be within a range of 20 Hz-20,000 Hz. In some embodiments, the first resonant frequency and/or the second resonant frequency may be within a range of 50 Hz-20,000 Hz. In some embodiments, the first resonant frequency and/or the second resonant frequency may be within a range of 100 Hz-12000 Hz.

In some embodiments, the first resonant frequency may be related to one or more structural parameters of the acoustic structure. The resonant frequency of the acoustic structure may be expressed as equation (8):

$$f = \frac{c_0}{2\pi}\sqrt{\frac{S}{lV}}, \quad (8)$$

where f denotes the resonant frequency of the acoustic structure, $c_0$ denotes the speed of sound in air, S denotes a cross-sectional area of the sound guiding tube, l denotes a length of the sound guiding tube, and V denotes a volume of the acoustic cavity.

According to equation (8), it can be known that the resonant frequency of the acoustic structure is related to the cross-section area of the sound guiding tube in the acoustic structure, the length of the sound guiding tube, and the volume of the acoustic cavity. Exemplarily, the resonant frequency of the acoustic structure is positively correlated with the cross-sectional area of the sound guiding tube and negatively correlated with the length of the sound guiding tube and/or the volume of the acoustic cavity. In some embodiments, the resonant frequency of the acoustic structure may be adjusted by setting the one or more structural parameters of the acoustic structure, e.g., the shape of the sound guiding tube, the dimension of the sound guiding tube, the volume of the acoustic cavity, etc., or a combination thereof. For example, when the length of the sound guiding tube and the volume of the acoustic cavity remain unchanged, the resonant frequency of the acoustic structure may be reduced by decreasing the hole diameter of the sound guiding tube to reduce the cross-sectional area of the sound guiding tube. As another example, when the cross-sectional area of the sound guiding tube and the length of the sound guiding tube remain unchanged, the resonant frequency of the acoustic structure may be increased by reducing the volume of the acoustic cavity. As another example, when the cross-sectional area of the sound guiding tube and the length of the sound guiding tube remain unchanged, the resonant frequency of the acoustic structure may be reduced by increasing the volume of the acoustic cavity.

In some embodiments, the resonant frequency of the acoustoelectric transducer may be related to one or more structural parameters of the acoustoelectric transducer. The one or more structural parameters of the acoustoelectric transducer may include the type of the acoustoelectric transducer, the material of the acoustoelectric transducer, the dimension of the acoustoelectric transducer, the arrangement of the acoustoelectric transducer, etc., or a combination thereof. Merely by way of example, the acoustoelectric transducer is illustrated as a rectangular cantilevered beam structure. In some embodiments, when other parameters (e.g., width, thickness, material) are the same, the resonant frequency of the acoustoelectric transducer is negatively correlated with the length of the cantilever beam structure.

In some embodiments, the resonant frequency of the acoustoelectric transducer and/or the resonant frequency of the acoustic structure may be adjusted by adjusting the one or more structural parameters of the acoustoelectric transducer and/or the acoustic structure, thereby obtaining the desired resonant frequency of the acoustoelectric transducer and/or the acoustic structure, and obtaining a desired frequency response curve of the microphone.

In some embodiments, in order to improve the response sensitivity of the microphone at the first resonant frequency $f_1$ and/or the second resonant frequency $f_2$ to the sound signal, the one or more structural parameters of the acoustic structure may be set, so that an absolute value of a difference between the first resonant frequency $f_1$ and the second resonant frequency $f_2$ may be not greater than a set threshold. In some embodiments, an absolute value of the difference between the first resonant frequency $f_1$ and the second resonant frequency $f_2$ may be not greater than 1000 Hz. In some embodiments, an absolute value of the difference between the first resonant frequency $f_1$ and the second resonant frequency $f_2$ may be less than 1000 Hz. In some embodiments, an absolute value of the difference between the first resonant frequency $f_1$ and the second resonant frequency $f_2$ may be less than 800 Hz. In some embodiments, an absolute value of the difference between the first resonant frequency $f_1$ and the second resonant frequency $f_2$ may be within a range of 100 Hz-200 Hz. In some embodiments, an absolute value of the difference between the first resonant frequency $f_1$ and the second resonant frequency $f_2$ may be within a range of 0 Hz-100 Hz. In some embodiments, an absolute value of the difference between the first resonant frequency $f_1$ and the second resonant frequency $f_2$ may be 0, i.e., the first resonant frequency $f_1$ is the same as the second resonant frequency $f_2$. In some embodiments, the one or more structural parameters of the acoustic structure and/or the acoustoelectric transducer may be set so that the absolute value of the difference between the first resonant frequency $f_1$ and the second resonant frequency $f_2$ is relatively small. In this case, the acoustic structure resonates with the sound signal at the first resonant frequency $f_1$, the frequency component containing the first resonant frequency $f_1$ within a certain frequency band is amplified. The acoustoelectric transducer resonates with the sound signal at the second resonant frequency $f_2$, such that the signal containing the second resonant frequency $f_2$ within a certain frequency band is amplified. Due to the absolute value of the difference between the first resonant frequency $f_1$ of the acoustic structure and the second resonant frequency $f_2$ of the acoustoelectric transducer is relatively small (e.g., less than 1000 Hz), the frequency component close to the first resonant frequency $f_1$ and/or the frequency component close to the second resonant frequency $f_2$ may be "amplified," so that the microphone has two resonant peaks (e.g., a resonant peak 1631 and a resonant peak 1632 in FIG. 16) having two high Q values when the volume of the microphone is not increased. In some embodiments, the sensitivity of the microphone at the first resonant frequency $f_1$ may be greater than the sensitivity of the acoustoelectric transducer at the first resonant frequency $f_1$. As shown in FIG. 16, a difference between the two may be denoted as ΔV1. In some embodiments, the sensitivity of the microphone at the second resonant frequency $f_2$ may be greater than the sensitivity of the acoustoelectric transducer at the second resonant frequency $f_2$. As shown in FIG. 16, a difference between the two may be denoted as ΔV2.

Figure 17:
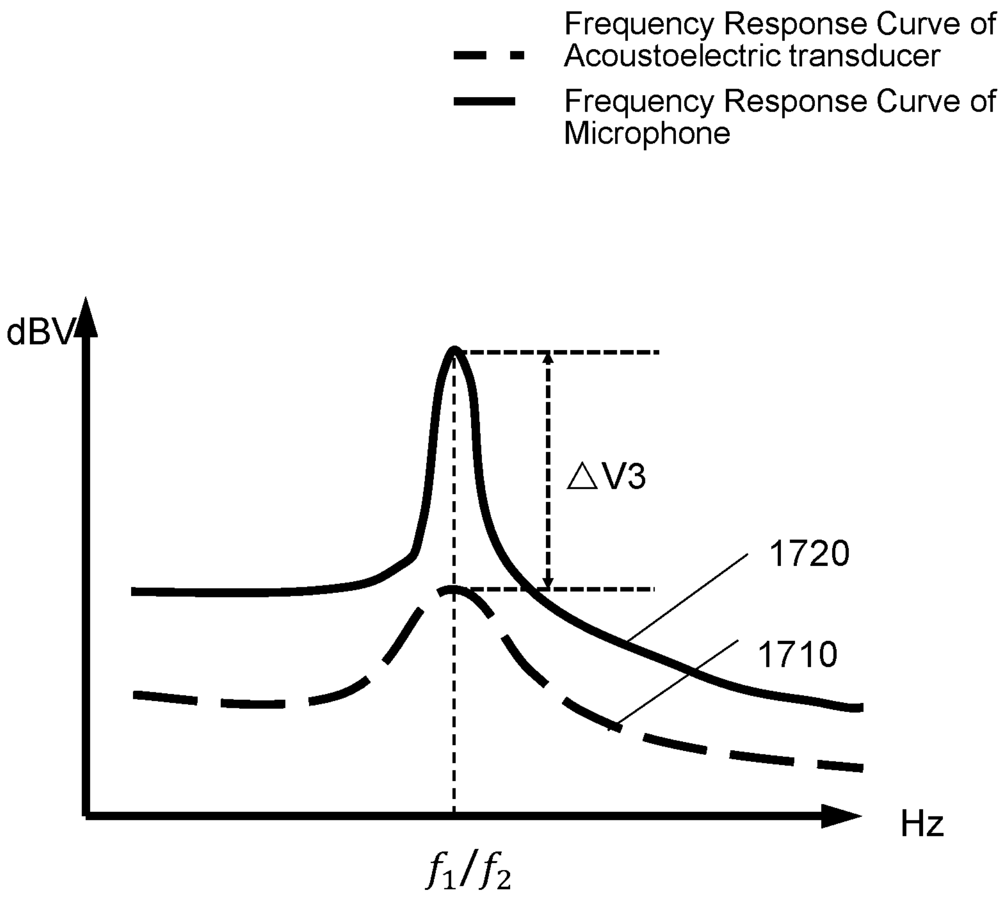
FIG. 17 is a schematic diagram illustrating frequency response curves of an exemplary microphone according to some embodiments of the present disclosure.

In some embodiments, the one or more structural parameters of the acoustic structure and/or the acoustoelectric transducer may be set so that the first resonant frequency $f_1$ is equal to the second resonant frequency $f_2$, i.e., an absolute value of the difference between the first resonant frequency $f_1$ and the second resonant frequency $f_2$ is 0 Hz. For the convenience of description, the present embodiment is illustrated in FIG. 17. FIG. 17 is a schematic diagram illustrating frequency response curves of an exemplary microphone according to some embodiments of the present disclosure. As shown in FIG. 17, a frequency response curve 1710 represents a frequency response curve of an acoustoelectric transducer (e.g., the acoustoelectric transducer 1420) and a frequency response curve 1720 represents a frequency response curve of a microphone (e.g., the microphone 1400) provided with an acoustic structure (e.g., the acoustic structure 1430). In some embodiments, the acoustic structure resonates with the sound signal at the first resonant frequency $f_1$, and the frequency component containing the first resonant frequency $f_1$ within a certain frequency band is amplified. The acoustoelectric transducer resonates with the sound signal at the second resonant frequency $f_2$, causing the signal containing the second resonant frequency $f_2$ within a certain frequency band to be amplified. Since the first resonant frequency $f_1$ formed by the acoustic structure is the same as the second resonant frequency $f_2$ formed by the acoustoelectric transducer, the frequency component close to the first resonant frequency $f_1$ and/or the frequency component close to the second resonant frequency $f_2$ may be "amplified" twice, thereby increasing the sensitivity of the microphone and the Q value of the microphone close to the first resonant frequency $f_1$/the second resonant frequency $f_2$ while not increasing the volume of the microphone. As shown in FIG. 17, an increase value of the microphone at the first resonant frequency $f_1$/the second resonant frequency $f_2$ may be denoted as ΔV3.

In some embodiments, by providing the acoustic structure of the microphone, relative to the sensitivity of the acoustoelectric transducer, the sensitivity of the microphone may be made to increase by 5 dBV-60 dBV within different resonant frequency ranges. In some embodiments, by providing the acoustic structure of the microphone, the sensitivity of the microphone may be made to increase by 10 dBV-40 dBV within different resonant frequency ranges. In some embodiments, the increase in sensitivity of the microphone within different resonant frequency ranges may be different. For example, the higher the resonant frequency, the greater the increase in sensitivity of the microphone in a corresponding frequency range. In some embodiments, the increase in sensitivity of the microphone may be expressed as a change in a slope of the sensitivity within the frequency range. In some embodiments, a slope variation of the sensitivity of the microphone within different resonant frequency ranges may be in a range of 0.0005 dBV/Hz-0.05 dBV/Hz. In some embodiments, a slope variation of the sensitivity of the microphone within different resonant frequency ranges may be in a range of 0.001 dBV/Hz-0.03 dBV/Hz. In some embodiments, a slope variation of the sensitivity of the microphone within different resonant frequency ranges may be in a range of 0.002 dBV/Hz-0.04 dBV/Hz.

Figure 18:
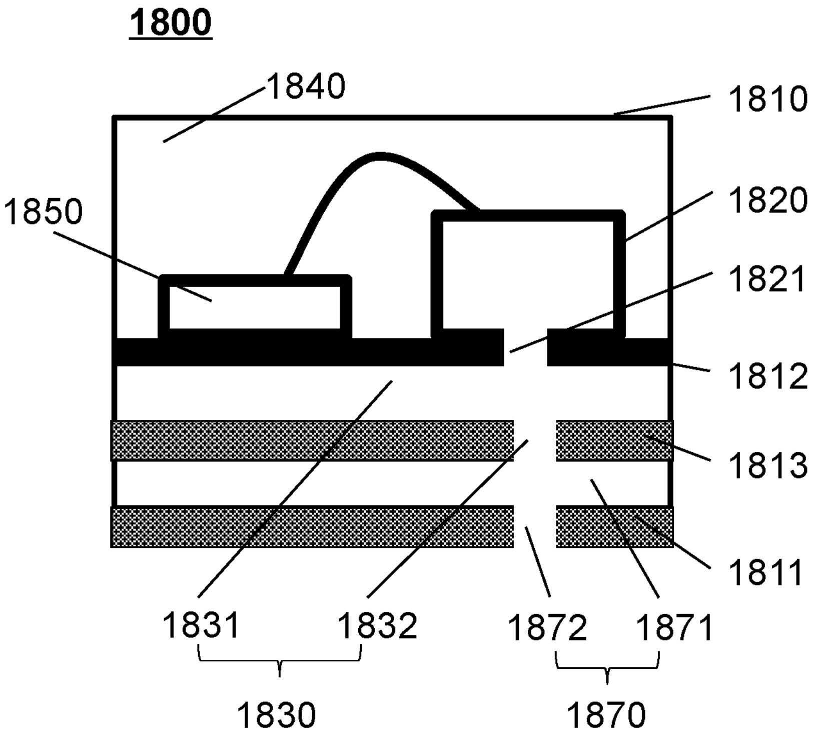
FIG. 18 is a schematic diagram illustrating an exemplary microphone according to some embodiments of the present disclosure.

FIG. 18 is a schematic diagram illustrating an exemplary microphone according to some embodiments of the present disclosure. As shown in FIG. 18, a microphone 1800 may include a housing 1810, at least one acoustoelectric transducer 1820, a sound inlet 1821, an acoustic structure 1830, a first cavity 1840, an application-specific integrated circuit 1850, and a second acoustic structure 1870.

One or more components in the microphone 1800 may be the same as or similar to one or more components of the microphone 1400 shown in FIG. 14. For example, the housing 1810, the first plate body 1812, the at least one acoustoelectric transducer 1820, the sound inlet 1821, the acoustic structure 1830, and the first cavity 1840 of the microphone 1800, etc., may be respectively the same as or similar to the housing 1410, the plate body 1412, the at least one acoustoelectric transducer 1420, the sound inlet 1421, the acoustic structure 1430, the first cavity 1440, and the application-specific integrated circuit 1450, etc., of the microphone 1400. The difference between the microphone 1800 and the microphone 1400 is that the microphone 1800 may further include the second acoustic structure 1870.

In some embodiments, the microphone 1800 may include a first plate body 1812 and a second plate body 1813. The first plate body 1812 and the second plate body 1813 are provided sequentially from top to bottom in the cavity formed by the housing 1810. The circumferential sides of the first plate body 1812 and the second plate body 1813 may be connected to the inner wall of the housing 1810, thereby dividing the cavity formed by the housing 1810 into the first cavity 1840, an acoustic cavity 1831, and a second acoustic cavity 1871. Specifically, at least a portion of the first plate body 1812 and the housing 1810 may form the first cavity 1840, and the first cavity 1840 may be used to accommodate at least partial structure of the microphone 1800 (e.g., the at least one acoustoelectric transducer 1820, the application-specific integrated circuit 1850, etc.). The first plate body 1812, the second plate body 1813, and at least a portion of the housing 1810 may define or form the acoustic cavity 1831, and the acoustic cavity 1831 is determined as a partial structure of the acoustic structure 1830. The second plate body 1813 and at least a portion of the housing 1810 may define or form the second acoustic cavity 1871, and the second acoustic cavity 1871 is determined as the partial structure of the second acoustic structure 1870.

In some embodiments, the second acoustic structure 1870 may be provided in series, in parallel, or in some other suitable manner with the acoustic structure 1830. As shown in FIG. 18, the second acoustic structure 1870 may be provided in series with the acoustic structure 1830. The second acoustic structure 1870 and the acoustic structure 1830 are provided in series means that the second acoustic cavity 1871 of the second acoustic structure 1870 may be acoustically communicated with the acoustic cavity 1831 of the acoustic structure 1830 through a sound guiding tube 1832 of the acoustic structure 1830. In some embodiments, the sound guiding tube 1832 of the acoustic structure 1830 may be disposed on the second plate body 1813, and the acoustic cavity 1831 may be acoustically communicated with the second acoustic cavity 1871 of the second acoustic structure 1870 through the sound guiding tube 1832. In some embodiments, a second sound guiding tube 1872 of the second acoustic structure 1870 may be provided on a cavity wall 1811 forming the second acoustic cavity 1871. The second acoustic cavity 1871 of the second acoustic structure 1870 is acoustically communicated with the outside of the microphone 1800 through the second sound guiding tube 1872. In some embodiments, the sound inlet 1821 may be provided on the first plate body 1812. The acoustic structure 1830 may be acoustically communicated with the acoustoelectric transducer 1820 through the sound inlet 1821. Component A is acoustically communicated with component B means that a sound signal may be transmitted through component A to component B. For example, the second acoustic cavity 1871 is acoustically communicated with the acoustic cavity 1831 through the sound guiding tube 1832 means that a sound signal may be transmitted from the second acoustic cavity 1871 to the acoustic cavity 1831 through the sound guiding tube 1832. As another example, the second acoustic cavity 1871 is acoustically communicated with the outside of the microphone 1800 through the second sound guiding tube 1872 means that a sound signal may enter the second acoustic cavity 1871 through the second sound guiding tube 1872. As another example, the acoustic structure 1830 may be acoustically communicated with the acoustoelectric transducer 1820 through the sound inlet 1821 means that a sound signal may be transmitted from the acoustic structure 1830 to the acoustoelectric transducer 1820 through the sound inlet 1821. The arrangement of a connection manner of the acoustic structure may be found in FIG. 20-FIG. 22 and their related descriptions.

In some embodiments, an external sound signal picked up by the microphone 1800 may first be adjusted (e.g., filtered, amplified, etc.) by the second acoustic structure 1870 and then transmitted to the acoustic structure 1830 through the sound guiding tube 1832. The acoustic structure 1830 further adjusts (e.g., filters, amplifies, etc.) the sound signal. The sound signal, after secondary adjustment, further enters the acoustoelectric transducer 1820 through the sound hole 1821, and the acoustoelectric transducer 1820 may produce an electrical signal corresponding to the sound signal.

In some embodiments, one or more structural parameters of the second acoustic structure 1870 may be the same as or different from one or more structural parameters of the acoustic structure 1830. For example, the shape of the second acoustic structure 1870 may be cylindrical and the shape of the acoustic structure 1830 may be cylindrical. As another example, a roughness degree of the inner wall of the second sound guiding tube 1872 of the second acoustic structure 1870 may be the same as or different from a roughness degree of the inner wall of the sound guiding tube 1832 of the acoustic structure 1830. As another example, a tube diameter of the second sound guiding tube 1872 of the second acoustic structure 1870 may be the same as or different from the tube diameter of the sound guiding tube 1832 of the acoustic structure 1830. As another example, the dimension (e.g., the length, the width, the depth, etc.) of the second acoustic cavity 1871 of the second acoustic structure 1870 may be the same as or different from the dimension of the acoustic cavity 1831 of the acoustic structure 1830.

In some embodiments, a resonant frequency (which may also be referred to as a third resonant frequency) of the second acoustic structure 1870 may be within a certain range. The frequency component of the sound signal at the third resonant frequency produces a resonance, which allows the second acoustic structure 1870 to amplify the frequency component of the sound signal close to the third resonant frequency. The acoustic structure 1830 may have the first resonant frequency, and a frequency component of the sound signal amplified by the second acoustic structure 1870 resonates at the first resonant frequency, which allows the acoustic structure 1830 to continuously amplify the frequency component of the sound signal close to the first resonant frequency. Considering that a particular acoustic structure only has a better amplification effect on the sound component within a specific frequency range, for the sake of understanding, the sound signal amplified by an acoustic structure may be regarded as a sub-band sound signal at the resonant frequency corresponding to the acoustic structure. For example, the above sound amplified by the second acoustic structure 1870 may be regarded as a sub-band sound signal at the third resonant frequency, and the sound signal continuously amplified by the acoustic structure 1830 can produce another sub-band sound signal at the first resonant frequency. The amplified sound signal is transmitted to the acoustoelectric transducer 1820, thereby producing a corresponding electrical signal. In this way, the acoustic structure 1830 and the second acoustic structure 1870 may respectively increase the Q value of the microphone 1800 in the frequency band including the first resonant frequency and the third resonant frequency, thereby increasing the sensitivity of the microphone 1800. In some embodiments, the increase in sensitivity of the microphone 1800 (relative to the acoustoelectric transducer) may be the same or different at different resonant frequencies. For example, when the third resonant frequency is greater than the first resonant frequency, the response sensitivity of the microphone 1800 at the third resonant frequency is greater than the response sensitivity of the microphone 1800 at the first resonant frequency. In some embodiments, the resonant frequency of the second acoustic structure 1870 and/or the acoustic structure 1830 may be adjusted by adjusting one or more structural parameters of the second acoustic structure 1870 and/or the acoustic structure 1830. In some embodiments, the first resonant frequency corresponding to the acoustic structure 1830 and the third resonant frequency corresponding to the second acoustic structure 1870 may be set according to an actual situation. For example, the first resonant frequency and the third resonant frequency may be smaller than the second resonant frequency, so that the sensitivity of the microphone 1800 in a mid-to-low frequency band may be increased. As another example, an absolute value of the difference between the first resonant frequency and the third resonant frequency may be smaller than a frequency threshold (e.g., 100 Hz, 200 Hz, 1000 Hz, etc.), such that the sensitivity and the Q value of the microphone 1800 may be improved within a certain frequency range. As another example, the first resonant frequency may be larger than the second resonant frequency and the third resonant frequency may be smaller than the second resonant frequency, which may make the frequency response curve of the microphone 1800 flatter and improve the sensitivity of the microphone 1800 within a relatively wide frequency range. More details regarding the frequency response of the microphone 1800 may be found in FIG. 19 and its related descriptions.

The descriptions of the above microphone 1800 are merely provided for the purpose of description and are not intended to limit the scope of the present disclosure. For those skilled in the art, various amendments and variations may be made. In some embodiments, the microphone 1800 may include a plurality of acoustic structures (e.g., 3, 5, 11, 14, 64, etc.). In some embodiments, the plurality of acoustic structures of the microphone may be connected in series, in parallel, or a combination thereof. In some embodiments, the magnitudes of the first resonant frequency, the second resonant frequency, and the third resonant frequency may be adjusted according to practical needs. For example, the first resonant frequency and/or the third resonant frequency may be less than, equal to, or greater than the second resonant frequency. As another example, the first resonant frequency may be less than, equal to, or greater than the third resonant frequency. These variations and modifications remain within the scope of protection of the present disclosure.

Figure 19:
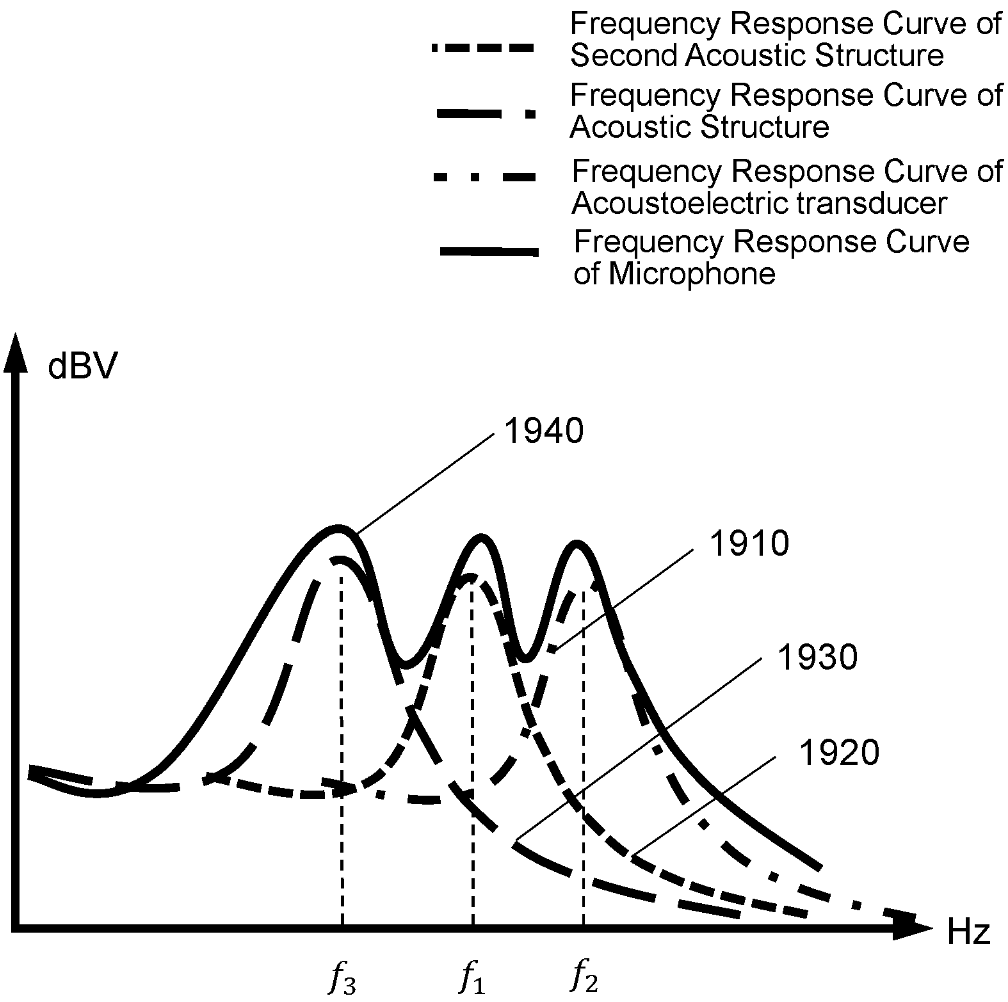
FIG. 19 is a schematic diagram illustrating frequency response curves of an exemplary microphone according to some embodiments of the present disclosure.

FIG. 19 is a schematic diagram illustrating frequency response curves of an exemplary microphone according to some embodiments of the present disclosure. As shown in FIG. 19, a frequency response curve 1910 represents a frequency response curve of an acoustoelectric transducer (e.g., the acoustoelectric transducer 1820), a frequency response curve 1920 represents a frequency response curve of an acoustic structure (e.g., the acoustic structure 1830), a frequency response curve 1930 represents a frequency response curve of a second acoustic structure (e.g., the second acoustic structure 1870), and a frequency response curve 1940 represents a frequency response curve of the a microphone (e.g., the microphone 1800).

The frequency response curve 1910 has a resonant peak at frequency $f_2$, then the frequency $f_2$ may be referred to as the resonant frequency of the acoustoelectric transducer (may also be referred to as a second resonant frequency). At the frequency $f_1$ of the frequency response curve 1920, the acoustic structure resonates with the received sound signal, causing a frequency band signal containing the frequency $f_1$ to be amplified, and the frequency response curve 1920 has a resonant peak at the frequency $f_1$. The frequency $f_1$ at which resonance occurs may be referred to as the resonant frequency of the acoustic structure (also referred to as a first resonant frequency). At the frequency $f_3$ of the frequency response curve 1930, the second acoustic structure resonates with the received sound signal, causing a frequency band signal containing frequency $f_3$ to be amplified, and the frequency response curve 1930 has a resonant peak at frequency $f_3$. The resonance $f_3$ at which resonance occurs may be referred to as the resonant frequency of the second acoustic structure (may also be called a third resonant frequency).

In some embodiments, a plurality (e.g., 2, 3, 5, 8, 11, 16, etc.) of acoustic structures may be provided, and the frequency response curves of the plurality of acoustic structures may have resonant peaks at the same or different frequencies, thereby allowing the frequency response curve 1940 of the microphone to have a plurality of resonant peaks at different frequencies on the basis of the resonant peaks of the frequency response curve of the acoustoelectric transducer. In some embodiments, a desired or ideal frequency response curve of the microphone may be obtained by selecting and/or adjusting the resonant frequencies of the plurality of acoustic structures. For example, the first resonant frequency $f_1$ and the third resonant frequency $f_3$ may be smaller than the second resonant frequency $f_2$, such that the sensitivity of the microphone in a mid-to-low frequency band can be improved. As another example, the first resonant frequency $f_1$ and the third resonant frequency $f_3$ may be larger than the second resonant frequency $f_2$, so that the sensitivity of the microphone in a mid-to-high frequency band can be improved. As another example, an absolute value of a difference between the first resonant frequency $f_1$ and/or the third resonant frequency $f_3$ and the second resonant frequency $f_2$ may be smaller than a frequency threshold (e.g., 100 Hz, 200 Hz, 500 Hz, 1000 Hz, etc.), such that the sensitivity and the Q-value of the microphone at the first resonant frequency $f_1$, the second resonant frequency $f_2$, and/or the third resonant frequency $f_3$ can be improved. In other words, the sensitivity of the microphone at the first resonant frequency $f_1$ may be greater than the sensitivity of the acoustic structure at the first resonant frequency $f_1$, the sensitivity of the microphone at the second resonant frequency $f_2$ may be greater than the sensitivity of the acoustoelectric transducer at the second resonant frequency $f_2$, and/or the sensitivity of the microphone at the third resonant frequency $f_3$ may be greater than the sensitivity of the second acoustic structure at the third resonant frequency $f_3$, which allows the microphone to have multiple (e.g., three in FIG. 19) resonant peaks with high Q values. For example, the second resonant frequency $f_2$ may be greater than the first resonant frequency $f_1$, and the third resonant frequency $f_3$ may be smaller than the first resonant frequency $f_1$, which allows the frequency response curve of the microphone to be flatter, thereby improving the sensitivity within a wider frequency range. In some embodiments, at least two of the resonant frequencies among the third resonant frequency, the first resonant frequency, and the second resonant frequency may be the same. For example, the second resonant frequency $f_2$ and the third resonant frequency $f_3$ may be equal to the first resonant frequency $f_1$. In this case, the second acoustic structure resonates with the sound signal at the third resonant frequency $f_3$, which allows the signal within a certain frequency range containing the third resonant frequency $f_3$ to be amplified. The acoustic structure resonates with the sound signal at the first resonant frequency $f_1$, which makes the signal within a certain frequency range containing the first resonant frequency $f_1$ to be amplified. The acoustoelectric transducer resonates with the sound signal at the second resonant frequency $f_2$, which makes the signal containing the second resonant frequency $f_2$ within a certain frequency range to be amplified. Due to the second resonant frequency $f_2$, the third resonant frequency $f_3$, and the first resonant frequency $f_1$ are the same, the sound signal is amplified three times within the microphone, thereby improving the Q value and the sensitivity of the microphone.

Figure 20:
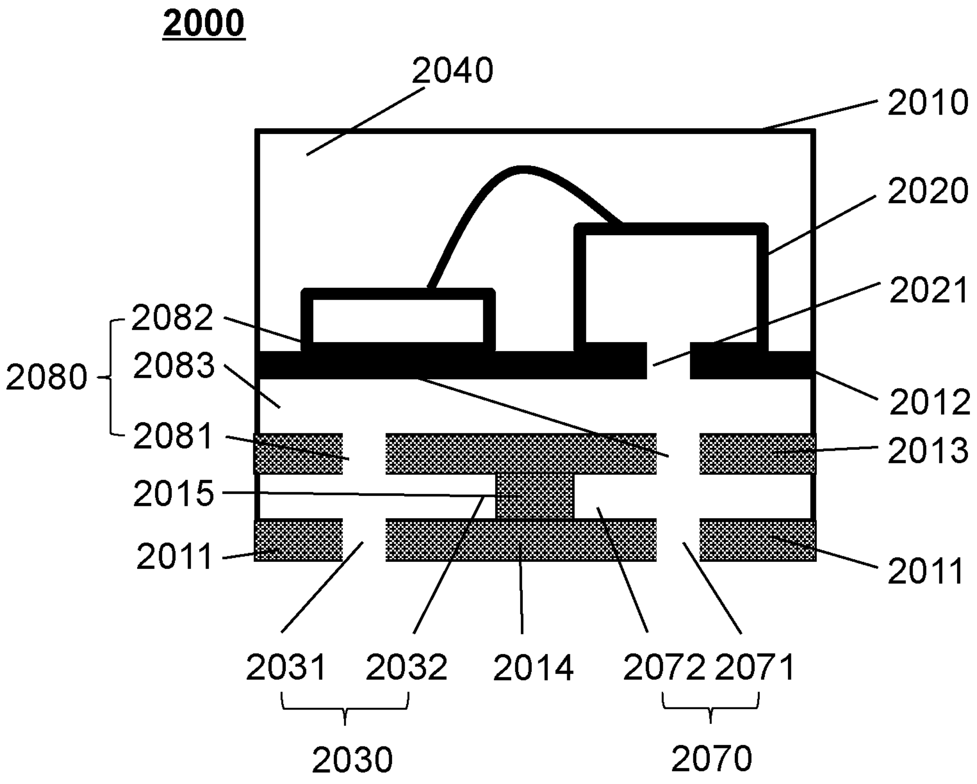
FIG. 20 is a schematic diagram illustrating an exemplary microphone according to some embodiments of the present disclosure.
Figure 21:
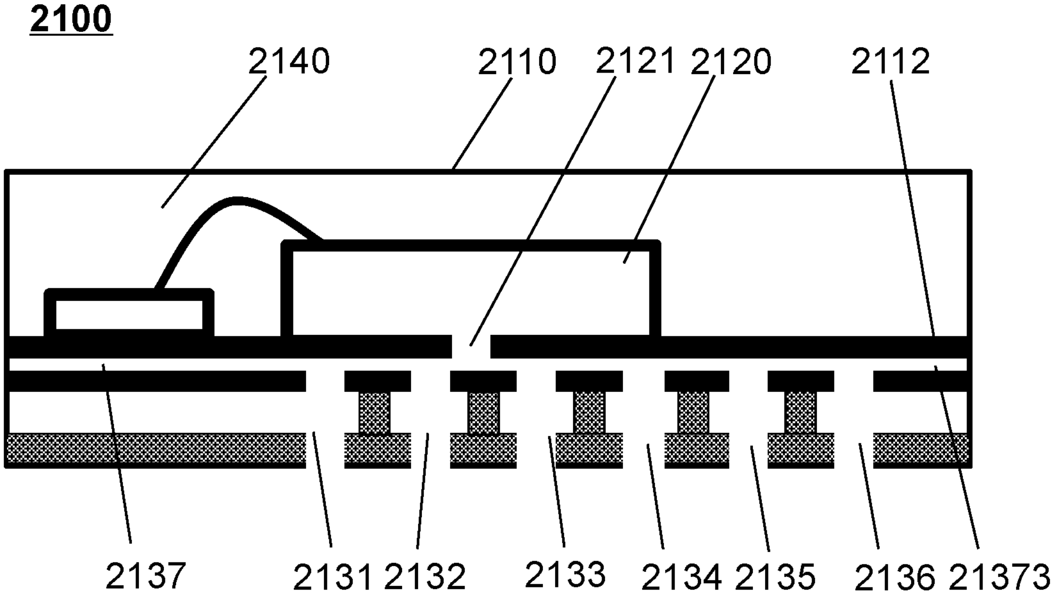
FIG. 21 is a schematic diagram illustrating an exemplary microphone according to some embodiments of the present disclosure.

FIG. 20 is a schematic diagram illustrating an exemplary microphone according to some embodiments of the present disclosure. FIG. 21 is a schematic diagram illustrating an exemplary microphone according to some embodiments of the present disclosure. As shown in FIG. 20, a microphone 2000 may include a housing 2010, at least one acoustoelectric transducer 2020, an acoustic structure 2030, a second acoustic structure 2070, and a third acoustic structure 2080. The acoustic structure 2030 may include a sound guiding tube 2031 and an acoustic cavity 2032, the second acoustic structure 2070 may include a second sound guiding tube 2071 and a second acoustic cavity 2072, and the third acoustic structure 2080 may include a third sound guiding tube 2081, a fourth sound guiding tube 2082, and a third acoustic cavity 2083.

One or more components of the microphone 2000 may be the same as or similar to one or more components of the microphone 1800 shown in FIG. 18. For example, the housing 2010, the at least one acoustoelectric transducer 2020, the sound inlet 2021, and the first cavity 2040, etc., of the microphone 2000 are respectively the same as or similar to the housing 1810, the at least one acoustoelectric transducer 1820, the sound inlet 1821, and the first cavity 1840, etc., of the microphone 1800.

In some embodiments, the microphone 2000 may include a first plate body 2012, a second plate body 2013, and a third plate body 2014. The first plate body 2012 and the second plate body 2013 may be provided sequentially from top to bottom in the cavity formed by the housing 2010. The first plate body 2012 may be physically connected to the second plate body 2013 and the housing. The circumferential sides of the second plate body 2013 and the third plate body 2014 may be connected to the inner wall of the housing 2010. In some embodiments, the first plate body 2012 and at least a portion of the housing 2010 may define or form the first cavity 2040.

In some embodiments, an isolation member 2015 of the microphone 2000 is provided between the second plate body 2013 and the third plate body 2014, thereby separating a space between the second plate body 2013 and the third plate body 2014.

In some embodiments, the first plate body 2012 and the at least a portion of housing 2010 may define or form the first cavity 2040. In some embodiments, the first plate body 2012, the second plate body 2013, and at least a portion of the housing 2010 may define or form a third acoustic cavity 2083. In some embodiments, the second plate body 2013, the third plate body 2014, at least a portion of the housing, and the isolation member 2015 may define or form the acoustic cavity 2032. In some embodiments, the second plate body 2013, the third plate body 2014, at least a portion of the housing, and the isolation member 2015 may define or form the second acoustic cavity 2072. The third plate body 2014 may be determined as the cavity wall 2011 of the second acoustic cavity 2072 and the third acoustic cavity 2032, and the second guiding tube 2071 and the guiding tube 2031 may be provided on the cavity wall 2011.

In some embodiments, the sound inlet 2021 of the microphone 2000 may be provided on the first plate body 2012, and the third acoustic cavity 2083 of the third acoustic structure 2080 may be acoustically communicated with the acoustoelectric transducer 2020 through the sound inlet 2021. In some embodiments, the third sound guiding tube 2081 and the fourth sound guiding tube 2082 of the third acoustic structure 2080 may be provided on the second plate body 2013. The acoustic cavity 2032 of the acoustic structure 2030 may be acoustically communicated with the third acoustic cavity 2083 of the third acoustic structure 2080 through the third sound guiding tube 2081. The second acoustic cavity 2072 of the second acoustic structure 2070 may be acoustically communicated with the third acoustic cavity 2083 through the fourth sound guiding tube 2082.

In some embodiments, the resonant frequency of the acoustic structure 2030 may be referred to as a first resonant frequency, the resonant frequency of the acoustoelectric transducer 2020 may be referred to as a second resonant frequency, the resonant frequency of the second acoustic structure 2070 may be referred to as a third resonant frequency, and the resonant frequency of the third acoustic structure 2080 may be referred to as a fourth resonant frequency. In some embodiments, the first resonant frequency, the third resonant frequency, and/or the fourth resonant frequency may be the same as or different from the second resonant frequency. For example, an absolute value of a difference between any two of the first resonant frequency, the third resonant frequency, the fourth resonant frequency, and the second resonant frequency may be greater than a frequency threshold (e.g., 100 Hz, 200 Hz, 500 Hz, 1000 Hz, etc.). As another example, an absolute value of a difference between any two of the first resonant frequency, the third resonant frequency, the fourth resonant frequency, and the second resonant frequency may be less than a frequency threshold (e.g., 100 Hz, 200 Hz, 500 Hz, 1000 Hz, etc.). In some embodiments, at least two of the third resonant frequency, the fourth resonant frequency, and the second resonant frequency may be the same. For example, the second resonant frequency $f_2$, the third resonant frequency $f_3$ may be the same as the fourth resonant frequency $f_4$. In this case, the second acoustic structure resonates with the sound signal at the third resonant frequency $f_3$, so that the signal containing the third resonant frequency $f_3$ within a certain frequency band is amplified. The third acoustic structure resonates with the sound signal at the fourth resonant frequency $f_4$, so that the signal containing the fourth resonant frequency $f_4$ within a certain frequency band is amplified. The acoustoelectric transducer resonates with the sound signal at the second resonant frequency $f_2$, so that the signal containing the second resonant frequency $f_2$ within a certain frequency band is amplified. Since the second resonant frequency $f_2$ and the third resonant frequency $f_3$ can be equal to the fourth resonant frequency $f_4$, the sound signal may be amplified three times in the microphone, thereby improving the Q value and the sensitivity of the microphone.

When using the microphone 2000 for sound signal processing, the sound signal may enter the acoustic cavity 2032 of the acoustic structure 2030 and the second acoustic cavity 2072 of the second acoustic structure 2070 through the sound guiding tube 2031 and the second sound guiding tube 2071, respectively. The acoustic structure 2030 may adjust the sound signal, and the frequency component of the sound signal at the first resonant frequency may resonate, such that the acoustic structure 2030 may amplify the frequency component of the sound signal close to the first resonant frequency. Similarly, the second acoustic structure 2070 may process the sound signal, and the frequency component of the sound signal at the third resonant frequency may resonate, so that the second acoustic structure 2070 may amplify the frequency component of the sound signal close to the third resonant frequency. The sound signal adjusted by the acoustic structure 2030 and the second acoustic structure 2070 may enter the third acoustic cavity 2083 through the third sound guiding tube 2081 and the fourth sound guiding tube 2082, respectively. The third acoustic structure 2080 may continue to regulate the sound signal, and the frequency component of the sound signal at the fourth resonant frequency may resonate, so that the third acoustic structure 2080 may amplify the frequency component of the sound signal close to the fourth resonant frequency. The sound signal adjusted by the acoustic structure 2030, the second acoustic structure 2070, and the third acoustic structure 2080 may be transmitted to the acoustoelectric transducer 2020 through the sound inlet 2021 of the acoustoelectric transducer 2020. The acoustoelectric transducer 2020 may produce an electrical signal based on the adjusted sound signal.

It should be noted that the acoustic structures included in the microphone 2000 are not limited to the acoustic structure 2030, the second acoustic structure 2070, and the third acoustic structure 2080 shown in FIG. 20. The count of acoustic structures, the one or more structural parameters of the acoustic structures, the connection manner of the acoustic structures, etc., included in the microphone 2000 may be set according to practical needs (e.g., the desired or/ideal resonance frequency, the sensitivity, etc.). FIG. 21 is a schematic diagram illustrating a structure of another microphone 2100. Different from the microphone 2000 in FIG. 20, a microphone 2100 contains a much larger count of acoustic structures. As shown in FIG. 21, the microphone 2100 includes a housing 2110, an acoustoelectric transducer 2120, a first plate body 2112, and a plurality of acoustic structures. The acoustoelectric transducer 2120 is accommodated with a first cavity 2140 formed by the housing 2110 and the first plate body 2112, which is acoustically communicated with the outside through a sound inlet 2121. The plurality of acoustic structures includes an acoustic structure 2131, an acoustic structure 2132, an acoustic structure 2133, an acoustic structure 2134, an acoustic structure 2135, an acoustic structure 2136, and an acoustic structure 2137. The acoustic structure 2137 includes an acoustic cavity 21373 and six sound guiding tubes respectively communicated with the acoustic cavity 2131, the acoustic structure 2132, the acoustic structure 2133, the acoustic structure 2134, the acoustic structure 2135, and the acoustic structure 2136. The acoustic cavity 21373 of the acoustic structure 2137 is acoustically communicated with the first cavity 2140 through a sound inlet 2121. The assemblies of the microphone 2100 and the processing of the sound signal may refer to the microphone 1800 in FIG. 18 and the microphone 2000 in FIG. 20, which will not be described herein.

Figure 22:
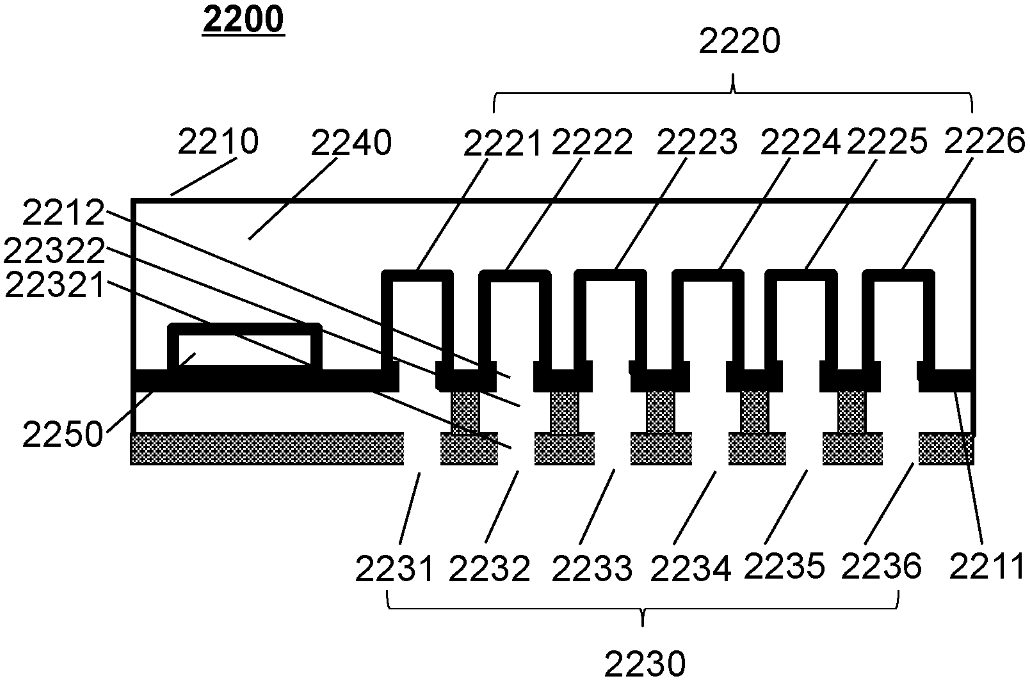
FIG. 22 is a schematic diagram illustrating an exemplary microphone according to some embodiments of the present disclosure.

FIG. 22 is a schematic diagram illustrating an exemplary microphone according to some embodiments of the present disclosure. As shown in FIG. 22, a microphone 2200 may include a housing 2210, an acoustoelectric transducer 2220, an acoustic structure 2230, and a first cavity 2240. In some embodiments, the microphone 2200 may include a first plate body 2211, and the first plate body 2211 may be disposed in a space formed by housing 2210. In some embodiments, the circumferential side of the first plate body 2211 may be connected to the inner wall of the housing 2210, thereby separating the space formed by the housing 2210 into an acoustic cavity (e.g., a second acoustic sub-cavity 22322 of a second acoustic sub-structure 2232) and a first cavity 2240. The first cavity 2240 may be used to accommodate the acoustoelectric transducer 2220 and an application-specific integrated circuit 2250. In some embodiments, the acoustoelectric transducer 2220 may include a plurality of acoustoelectric transducers, for example, a first acoustoelectric transducer 2221, a second acoustoelectric transducer 2222, a third acoustoelectric transducer 2223, a fourth acoustoelectric transducer 2223, a fifth acoustoelectric transducer 2225, and a sixth acoustoelectric transducer 2226. In some embodiments, the acoustic structure 2230 may include a plurality of acoustic sub-structures, for example, a first acoustic sub-structure 2231, a second acoustic sub-structure 2232, a third acoustic sub-structure 2233, a fourth acoustic sub-structure 2234, a fifth acoustic sub-structure 2235, and a sixth acoustic sub-structure 2236. In some embodiments, the plurality of sub-structures of the microphone 2200 corresponds to the plurality of acoustoelectric transducers one by one, i.e., one acoustic sub-structure corresponds to one acoustoelectric transducer. For example, the first acoustic sub-structure 2231 is acoustically communicated with the first acoustoelectric transducer 2221 through a first sub-sound inlet on the first plate body 2211 of the microphone 2200, the second acoustic sub-structure 2232 is acoustically communicated with the second acoustoelectric transducer 2222 through a second sub-sound inlet on the first plate body 2211, the third acoustic sub-structure 2233 is acoustically communicated with the third acoustoelectric transducer 2223 through a third sub-sound inlet on the first plate body 2211, the fourth acoustic sub-structure 2234 is acoustically communicated with the fourth acoustoelectric transducer 2224 through a fourth sub-sound inlet on the first plate body 2211, the fifth acoustic sub-structure 2235 is acoustically communicated with the fifth acoustoelectric transducer 2225 through a fifth sub-sound inlet on the first plate body 2211, and the sixth acoustic sub-structure 2236 is acoustically communicated with the sixth acoustoelectric transducer 2226 through a sixth sub-sound inlet on the first plate body 2211. For ease of description, the second acoustic sub-structure 2232 is illustrated as an example. The second acoustic sub-structure 2232 includes a second sub-sound guiding tube 22321 and a second acoustic sub-cavity 22322. The second acoustic sub-structure 2232 is acoustically communicated with the outside of the microphone 2200 through the second sub-sound guiding tube 22321 for receiving sound signals. The second acoustic sub-cavity 22322 of the second acoustic sub-structure 2232 is acoustically communicated with the second acoustoelectric transducer 2222 through the second sub-sound inlet 2212 on the first plate body 2211. In some embodiments, each acoustic sub-structure may be combined with one corresponding acoustoelectric transducer, for example, the first acoustic sub-structure 2231 is acoustically communicated with the acoustoelectric transducer 2221 through the first sub-sound inlet on the first plate body 2211 of the microphone 2200. Each acoustic sub-structure can transmit an amplified sound signal to the corresponding acoustoelectric transducer, and finally each acoustoelectric transducer can convert the received sound signal into an electrical signal and input the electrical signal to the application-specific integrated circuit 2250 for processing.

In some embodiments, all acoustic sub-structures of the microphone may correspond to one acoustoelectric transducer. For example, the sound guiding tubes of the first acoustic sub-structure 2231, the second acoustic sub-structure 2232, the third acoustic sub-structure 2233, the fourth acoustic sub-structure 2234, the fifth acoustic sub-structure 2235, and the sixth acoustic sub-structure 2236 may respectively be acoustically communicated with the outside of the microphone 2200, and their acoustic sub-cavities may be acoustically communicated with the acoustoelectric transducer. As another example, the microphone 2200 may include a plurality of acoustoelectric transducers, and a portion of the first acoustic sub-structure 2231, the second acoustic sub-structure 2232, the third acoustic sub-structure 2233, the fourth acoustic sub-structure 2234, the fifth acoustic sub-structure 2235, and the sixth acoustic sub-structure 2236 may be acoustically communicated with one acoustoelectric transducer of the plurality of acoustoelectric transducers, and another portion of the acoustic sub-structures may be acoustically communicated with another acoustoelectric transducers. As further another example, the microphone 2200 may include a plurality of acoustoelectric transducers, and the acoustic sub-cavity of the first acoustic sub-structure 2231 may be acoustically communicated with the second acoustic sub-cavity 22322 of the second acoustic sub-structure 2232 through the second sub-sound guiding tube 22321 of the second acoustic sub-structure 2232. The second acoustic sub-cavity 22322 of the second acoustic sub-structure 2232 may be acoustically communicated with the third acoustic sub-cavity of the third acoustic sub-structure 2233 through the third sub-sound guiding tube of the third acoustic sub-structure 2233. The fourth acoustic sub-structure 2234 may be acoustically communicated with the fifth acoustic sub-cavity of the fifth acoustic sub-structure 2235 through the fifth sub-sound guiding tube of the fifth acoustic sub-structure 2235. The fifth acoustic sub-cavity of the fifth acoustic sub-structure 2235 may be acoustically communicated with the sixth acoustic sub-cavity of the sixth acoustic sub-structure 2236 through the sixth sub-sound guiding tube of the sixth acoustic sub-structure 2236. The third acoustic sub-cavity of the third acoustic sub-structure 2233 and the sixth acoustic sub-cavity of the sixth acoustic sub-structure 2236 may be acoustically communicated with the same or different acoustoelectric transducer. Such variations are within the scope of protection of this application.

In some embodiments, each acoustic sub-structure of the acoustic structure 2230 may have a specific resonant frequency, respectively, and the sound signal adjust by each acoustic sub-structure may be transmitted to the acoustoelectric transducer acoustically communicated with each acoustic sub-structure, and the acoustoelectric transducer converts the received sound signal to the electrical signal. For example, the second acoustic sub-structure 2232 may have a third resonant frequency, and the second acoustic sub-structure 2232 may modulate the sound signal, and a frequency component of the sound signal at the third resonant frequency can resonate, allowing the second acoustic sub-structure 2232 to amplify the frequency component of the sound signal close to the third resonant frequency. The sound signal adjusted by the second acoustic sub-structure 2232 may be transmitted to the second acoustoelectric transducer 2222 through the second sub-sound inlet 2212 on the first plate body 2211.

In some embodiments, each of the acoustoelectric transducer 2220 may respectively have a particular resonant frequency, and each of the acoustoelectric transducer may receive the sound signal through a corresponding sound inlet that is adjust by each of the acoustic sub-structures, respectively, and convert the sound signal to the electrical signal within a certain frequency band range containing the resonant frequency of each the acoustoelectric transducer. For example, the second acoustoelectric transducer 2222 may have a fifth resonant frequency, and the second acoustoelectric transducer 2222 may receive the sound signal adjusted by the second acoustic sub-structure 2222 through the second sub-sound inlet 2212 and convert a signal of a certain frequency band range containing the fifth resonant frequency of that sound signal into an electrical signal. In some embodiments, the resonant frequencies of the acoustoelectric transducer 2220 may be different, so that the signals in different frequency ranges of the sound signal may be converted into corresponding electrical signals respectively, which in turn makes the electrical signal output by the microphone have a wider frequency range and improves the Q value and the sensitivity of the microphone within the wider frequency range. The descriptions of adjusting the resonant frequency of the acoustoelectric transducer may be found in a patent application entitled "Microphones" filed on the same day as this application, which will not be repeated herein.

In some embodiments, by providing one or more acoustic structures in the microphone, for example, the acoustic structure 1830 of the microphone 1800, the second acoustic structure 1870 of the microphone 1800, the acoustic structure 2030 of the microphone 2000, the second acoustic structure 2070 of the microphone 2000, and the third acoustic structure 2080 of the microphone 2000, the resonant frequency of the microphone may be increased, which may in turn increase the sensitivity of the microphone within a wider frequency band range. In addition, by designing manners of connection of the plurality of acoustic structures and/or the plurality of acoustoelectric transducers, for example, each acoustic sub-structure in microphone 2200 shown in FIG. 22 is provided in correspondence with each acoustoelectric transducer, the sensitivity of the microphone 2200 within a wider frequency band range may be improved.

Figure 23:
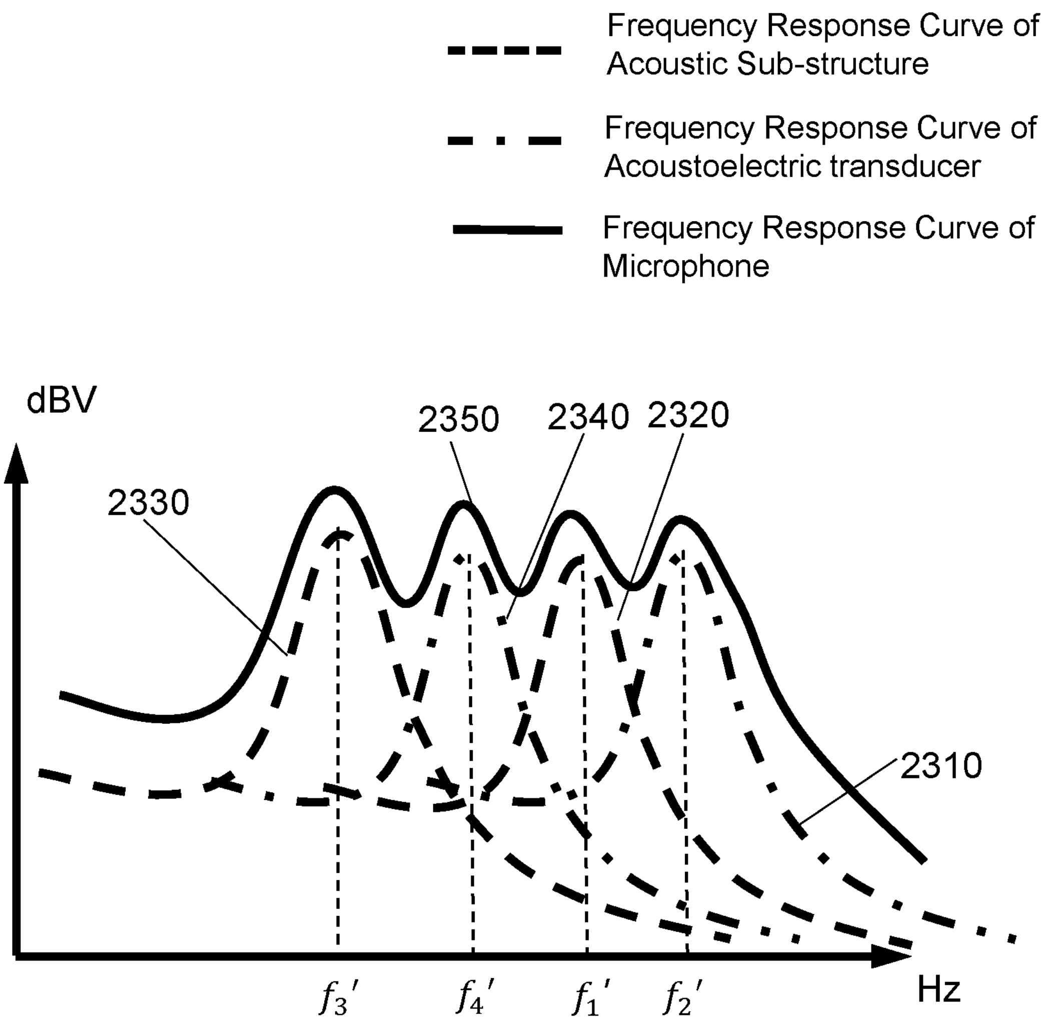
FIG. 23 is a schematic diagram illustrating frequency response curves of an exemplary microphone according to some embodiments of the present disclosure.

FIG. 23 is a schematic diagram illustrating frequency response curves of an exemplary microphone according to some embodiments of the present disclosure. As shown in FIG. 23, a frequency response curve 2310 represents a frequency response curve of a first acoustoelectric transducer (e.g., the first acoustoelectric transducer 2221), a frequency response curve 2320 represents a frequency response curve of a first acoustic sub-structure (e.g., the first acoustic sub-structure 2231), a frequency response curve 2330 represents a frequency response curve of a second acoustic sub-structure (e.g., the second acoustic sub-structure 2232), a frequency response curve 2340 represents a frequency response curve of a second acoustoelectric transducer (e.g., the second acoustoelectric transducer 2222), and a frequency response curve 2350 represents a frequency response curve of a microphone (e.g., the microphone 2200). The frequency response curve 2310 has a resonant peak at a second resonant frequency $f_2'$, i.e., at the second resonant frequency $f_2'$, due to the resonance effect, the frequency component of the sound signal including the second resonant frequency $f_2$ may be amplified in the acoustoelectric transducer. At a first resonant frequency $f_1'$ of the frequency response curve 2320, the acoustic sub-structure resonates with the received sound signal such that the frequency component containing the first resonant frequency $f_1'$ of the frequency band signal is amplified. At a third resonant frequency $f_3$ of the frequency response curve 2330, the second acoustic sub-structure 2232 resonates with the received sound signal, causing amplification of the signal in the frequency band signal containing the third resonant frequency $f_3$ to be amplified. At a fourth resonant frequency $f_4'$ of the frequency response curve 2340, due to the resonance effect, the frequency component of the sound signal containing the fourth resonant frequency $f_4'$ may be amplified in the second acoustoelectric transducer 2222.

Figure 24:
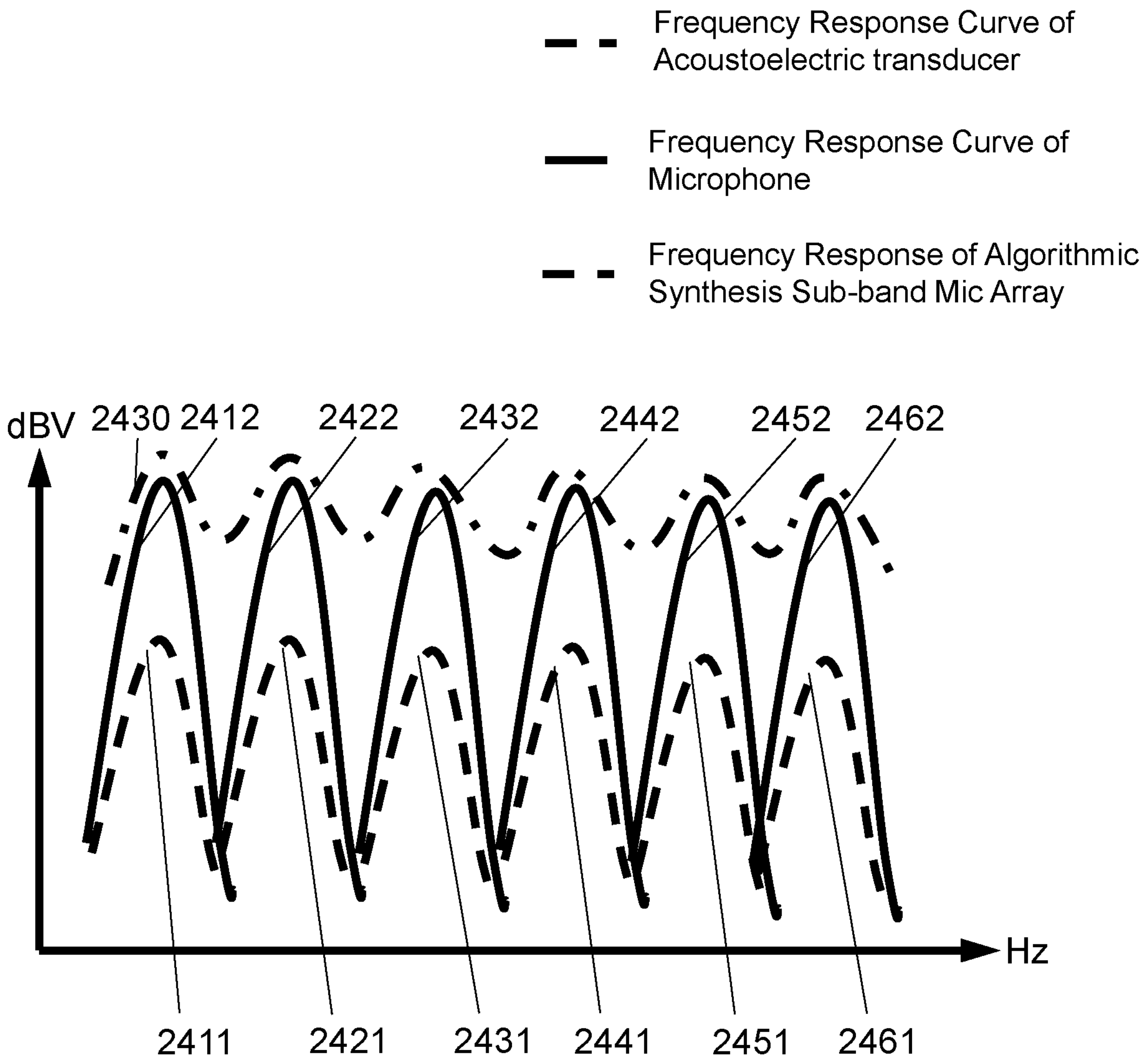
FIG. 24 is a schematic diagram illustrating frequency response curves of an exemplary microphone according to some embodiments of the present disclosure.

In some embodiments, the resonant frequency of each acoustic sub-structure may be made different from the resonant frequency of the corresponding acoustoelectric transducer to form a molecular band mic array. For example, as shown in FIG. 23 and FIG. 24, the resonant frequency of the first acoustoelectric transducer 2221 (i.e., the second resonant frequency $f_2'$) is different from the resonant frequency of the first acoustic sub-structure 2231 (i.e., the first resonant frequency $f_1'$). The resonant frequency of the second acoustic sub-structure 2232 (i.e., the third resonant frequency $f_3'$) is different from the resonant frequency of the second acoustoelectric transducer 2222 (i.e., the fourth resonant frequency $f_4'$), thereby forming the molecular band mic array.

In some embodiments, a plurality of acoustoelectric transducer may be provided, e.g., the first acoustoelectric transducer 2221, the second acoustoelectric transducer 2222, etc. The frequency response curves of the plurality of acoustoelectric transducers may have resonant peaks at the same or different frequencies, thereby allowing the frequency response curve 2350 of the microphone to have a plurality of resonant peaks at different frequencies. In some embodiments, a desired or ideal frequency response curve of the microphone may be obtained by selecting and/or adjusting the resonant frequencies of the plurality of acoustoelectric transducers. For example, the third resonant frequency $f_3'$ may be smaller than the fourth resonant frequency $f_4'$, thereby improving the sensitivity of the microphone within a mid-to-low frequency band. The second acoustic sub-structure 2232 resonates with the sound signal at the third resonant frequency $f_3'$, thereby amplifying the signal within a certain frequency range containing the third resonant frequency $f_3$'. The second acoustoelectric transducer 2222 resonates with the sound signal at the fourth resonant frequency $f_4$', thereby amplifying the signal within a certain frequency range containing the fourth resonant frequency $f_4$. The sound signal is amplified twice within the transducer, thereby increasing the Q value and the sensitivity of the microphone.

In some embodiments, an absolute value of a difference between the resonant frequency of the acoustic sub-structure and the resonant frequency of its corresponding acoustoelectric transducer may be not greater than a set threshold. For ease of description, the second acoustic sub-structure 2232 and the second acoustoelectric transducer 2222 are described as examples. In some embodiments, an absolute value of the difference between the fourth resonant frequency $f_4$' and the third resonant frequency $f_3$' may be less than 1200 Hz. In some embodiments, an absolute value of the difference between the fourth resonant frequency $f_4$' and the third resonant frequency $f_3$' may be less than 1000 Hz. In some embodiments, an absolute value of the difference between the fourth resonant frequency $f_4$' and the third resonant frequency $f_3$' may be less than 800 Hz. In some embodiments, an absolute value of the difference between the fourth resonant frequency $f_4$' and the third resonant frequency $f_3$' is within a range of 100 Hz-1000 Hz. In some embodiments, an absolute value of the difference between the fourth resonant frequency $f_4$' and the third resonant frequency $f_3$' is within a range of 50 Hz to 800 Hz. In some embodiments, an absolute value of the difference between the fourth resonant frequency $f_4$' and the third resonant frequency $f_3$' is within a range of 0 Hz to 500 Hz. In some embodiments, the resonant frequency of the acoustic sub-structure may be equal to the resonant frequency of its corresponding acoustoelectric transducer. For ease of description again, the second acoustic sub-structure 2232 and the second acoustoelectric transducer 2222 are described as examples. In some embodiments, the fourth resonant frequency $f_4$ of the second acoustoelectric transducer 2222 may be equal to the third resonant frequency $f_3$' of the second acoustic sub-structure 2232, i.e., an absolute value of the difference between the fourth resonant frequency $f_4$ of the second acoustoelectric transducer 2222 and the third resonant frequency $f_3$' of the second acoustic sub-structure 2232 is 0, further improving the response sensitivity of the microphone to the sound signal at the third resonant frequency $f_3$' and/or the fourth resonant frequency $f_4$.

In some embodiments, an absolute value of the difference between the fourth resonant frequency $f_4$ and the third resonant frequency $f_3$' may be less than a frequency threshold (e.g., 100 Hz, 200 Hz, 500 Hz, 1000 Hz, etc.), thereby improving the sensitivity and the Q value of the microphone at the third resonant frequency $f_3$' and/or the fourth resonant frequency $f_4$. In other words, the response sensitivity of the microphone at the third resonant frequency $f_3$' may be greater than that of the second acoustic sub-structure 2232 at the third resonant frequency $f_3$, and the response sensitivity of the microphone at the fourth resonant frequency $f_4$' may be greater than that of the second acoustoelectric transducer 2222 at the fourth resonant frequency $f_4$.

FIG. 24 is a schematic diagram illustrating frequency response curves of an exemplary microphone according to some embodiments of the present application. As shown in FIG. 24, a frequency response curve 2411, a frequency response curve 2421, a frequency response curve 2431, a frequency response curve 2441, a frequency response curve 2451, and a frequency response curve 2461 are frequency response curves of acoustoelectric transducers (e.g., the first acoustoelectric transducer 2221, the second acoustoelectric transducer 2222, the third acoustoelectric transducer 2223, the fourth acoustoelectric transducer 2224, the fifth acoustoelectric transducer 2225, or the sixth acoustoelectric transducer 2226), respectively. A frequency response curve 2412, a frequency response curve 2422, a frequency response curve 2432, a frequency response curve 2442, a frequency response curve 2452, and a frequency response curve 2462 are the frequency response curves of acoustoelectric transducers each of which includes a combination of an acoustic sub-structure and a corresponding acoustoelectric transducer (e.g., as shown in FIG. 22, a combination of the first acoustic sub-structure 2231 and the first acoustoelectric transducer 2221, a combination of the second acoustic sub-structure 2232 and the second acoustoelectric transducer 2222, a combination of the third acoustic sub-structure 2233 and the third acoustoelectric transducer 2223, a combination of the fourth acoustic sub-structure 2234 and the fourth acoustoelectric transducer 2224, a combination of the fifth acoustic sub-structure 2235 and the fifth acoustoelectric transducer 2225, and a combination of the sixth acoustic sub-structure 2236 and the sixth acoustoelectric transducer 2226), respectively. The frequency response curve 2430 represents a frequency response curve of a microphone (e.g., the microphone 2200). As shown in FIG. 24, the frequency response curve 2412 may be formed by an overlapping of the frequency response curve 2411 of the first acoustoelectric transducer 2221 and the frequency response curve of the first acoustic sub-structure 2231 (not shown). The resonant frequency of the first acoustoelectric transducer 2221 is equal to the resonant frequency of the first acoustic sub-structure 2231. The frequency response curve 2422 may be formed by an overlapping of the frequency response curve 2421 of the second acoustoelectric transducer 2222 and the frequency response curve (not shown) of the second acoustic sub-structure 2232. The resonant frequency of the second acoustoelectric transducer 2222 is equal to the resonant frequency of the second acoustic sub-structure 2232. The frequency response curve 2432 may be formed by an overlapping of the frequency response curve 2431 of the third acoustoelectric transducer 2223 and the frequency response curve (not shown) of the third acoustic sub-structure 2233. The resonant frequency of the third acoustoelectric transducer 2223 is equal to the resonant frequency of the third acoustic sub-structure 2233. The frequency response curve 2442 may be formed by an overlapping of the frequency response curve 2441 of the fourth acoustoelectric transducer 2224 and the frequency response curve (not shown) of the fourth acoustic sub-structure 2234. The resonant frequency of the fourth acoustoelectric transducer 2224 is equal to the resonant frequency of the fourth acoustic sub-structure 2234. The frequency response curve 2452 may be formed by an overlapping of the frequency response curve 2451 of the fifth acoustoelectric transducer 2225 and the frequency response curve (not shown) of the fifth acoustic sub-structure 2235. The resonant frequency of the fifth acoustoelectric transducer 2225 is equal to the resonant frequency of the fifth acoustic sub-structure 2235. The frequency response curve 2462 may be formed by an overlapping of the frequency response curve 2461 of the sixth acoustoelectric transducer 2226 and the frequency response curve (not shown) of the sixth acoustic sub-structure 2236. The resonant frequency of the sixth acoustoelectric transducer 2226 is equal to the resonant frequency of the sixth acoustic sub-structure 2236. The frequency response curve 2430 may be obtained by algorithmic synthesis of the frequency response curve 2412, the frequency response curve 2422, the frequency response curve 2432, the frequency response curve 2442, the frequency response curve 2452, and the frequency response curve 2462. In some embodiments, by setting the resonant frequency of each acoustoelectric transducer (or each acoustic sub-structure) of the microphone to different frequency ranges, the microphone may be made to have a larger output within a wider frequency range, meanwhile, the frequency response curve of the microphone (e.g., the frequency response curve 2430) is smoother.

In some embodiments, a plurality of acoustoelectric transducer may be provided in the microphone (e.g., the first acoustoelectric transducer 2221, the second acoustoelectric transducer 2222, the third acoustoelectric transducer 2223, the fourth acoustoelectric transducer 2224, the fifth acoustoelectric transducer 2225, the sixth acoustoelectric transducer 2226 in FIG. 22), and the plurality of acoustoelectric transducers may have the same or different resonant frequencies, such that the plurality of acoustoelectric transducers have resonant peaks in their corresponding frequency response curves, and the frequency response curve of the microphone has a plurality of resonant peaks, thereby improving the output of the microphone within a wider frequency range. In some embodiments, in order to improve the response sensitivity of the microphone to sound signals at the resonant frequency of the acoustoelectric transducer and/or the acoustic sub-structure, one or more structural parameters of the acoustoelectric transducer and one or more structural parameters of the acoustic sub-structure that is acoustically communicated with the acoustoelectric transducer may be set, which makes an absolute value of a difference between the resonant frequency of the acoustoelectric transducer and the resonant frequency of the acoustic sub-structure acoustically communicated with the acoustoelectric transducer smaller than a frequency threshold value (e.g., 100 Hz, 200 Hz, 500 Hz, 1000 Hz, etc.). In some embodiments, the resonant frequency of the acoustoelectric transducer may be equal to the resonant frequency of the acoustic sub-structure acoustically communicated with the acoustoelectric transducer. The acoustic sub-structure resonates with the sound signal at its resonant frequency, causing the frequency components within a certain frequency band containing that resonant frequency to be amplified. The acoustoelectric transducer (acoustically communicated with the acoustic sub-structure) resonates with the sound signal at its resonant frequency, such that the signal within a certain frequency band containing its resonant frequency is amplified. Since the resonant frequency of the acoustic sub-structure is equal to the resonant frequency of the acoustoelectric transducer, the frequency component close to the resonant frequency of the acoustic sub-structure and/or the frequency component close to the resonant frequency of the acoustoelectric transducer may be "amplified" twice, so that the sensitivity and the Q value of the microphone close to the resonant frequency of the acoustic sub-structure and/or the resonant frequency of the acoustoelectric transducer may be increased without increasing the dimension of the microphone.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, it will be understood by those skilled in the art that aspects of the present disclosure may be illustrated and described by a count of patentable categories or situations, including any new and useful process, machine, product or combination of substances or any new and useful improvement to them.

Furthermore, unless specifically described in the claims, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment. In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the required properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

What is claimed is:

1. A microphone, comprising:

an acoustoelectric transducer configured to convert a sound signal to an electrical signal; and an acoustic structure including a sound guiding tube and an acoustic cavity, the acoustic cavity being acoustically communicated with the acoustoelectric transducer and being acoustically communicated with an outside of the microphone through the sound guiding tube; wherein the acoustic structure has a first resonant frequency, the acoustoelectric transducer has a second resonant frequency, an absolute value of a difference between the first resonant frequency and the second resonant frequency is not greater than 1000 Hz, the acoustic structure includes a plurality of acoustic sub-structures, and the microphone includes a plurality of acoustoelectric transducers, the plurality of acoustoelectric transducers correspond to the plurality of acoustic sub-structures one by one, each acoustic sub-structure includes a sub-sound guiding tube and an acoustic sub-cavity, the acoustic sub-cavity of each acoustic sub-structure is acoustically communicated with a corresponding acoustoelectric transducer and acoustically communicated with the outside of the microphone through the sub-sound guiding tube.

2. The microphone of claim 1, further comprising a housing and a plate body, the plate body dividing a space inside the housing into at least two cavities, the at least two cavities including a first cavity and the acoustic cavity, the acoustoelectric transducer being provided in the first cavity.

3. The microphone of claim 2, further including a sound inlet, wherein the sound inlet is provided on the plate body, the acoustic cavity is acoustically communicated with the acoustoelectric transducer through the sound inlet, and the sound guiding tube is provided on a cavity wall forming the acoustic cavity.

4. The microphone of claim 1, wherein the acoustoelectric transducer is located in the acoustic cavity of the acoustic structure, and the sound signal enters the acoustic cavity through the sound guiding tube and is transmitted to the acoustoelectric transducer.

5. The microphone of claim 1, wherein an absolute value of a difference between the first resonant frequency and the second resonant frequency is not greater than 100 Hz.

6. The microphone of claim 1, wherein the first resonant frequency is equal to the second resonant frequency.

7. The microphone of claim 1, wherein a response sensitivity of the microphone at the first resonant frequency is greater than that of the acoustoelectric transducer at the first resonant frequency, and/or the response sensitivity of the microphone at the second resonant frequency is greater than that of the acoustoelectric transducer at the second resonant frequency.

8. The microphone of claim 1, further comprising a second acoustic structure including a second sound guiding tube and a second acoustic cavity, wherein the second acoustic cavity is acoustically communicated with the outside of the microphone through the second sound guiding tube; and the second acoustic cavity is acoustically communicated with the acoustic cavity through the sound guiding tube; wherein the second acoustic structure has a third resonant frequency, the third resonant frequency is different from the first resonant frequency and/or the second resonant frequency, and an absolute value of a difference between any two of the third resonant frequency, the first resonant frequency, and the second resonant frequency is within a range of 100 Hz-1000 Hz.

9. The microphone of claim 8, further including a first plate body and a second plate body, wherein the first plate body and the second plate body divide a space inside the housing into a first cavity, the acoustic cavity, and the second acoustic cavity;

the first plate body and at least a portion of the housing define the first cavity;

the first plat body, the second plate body, and at least a portion of the housing define the acoustic cavity; and the second plate body and at least a portion of housing define the second acoustic cavity.

10. The microphone of claim 9, further including a sound inlet, wherein the acoustoelectric transducer is provided in the first cavity, the sound inlet is provided in the first plate body, the sound guiding tube is provided on the second plate body, and the second sound guiding tube is provided on a cavity wall forming the second acoustic cavity.

11. The microphone of claim 1, further comprising a second acoustic structure including a second sound guiding tube and a second acoustic cavity, wherein the second acoustic cavity is acoustically communicated with the outside of the microphone through the second sound guiding tube; and the second acoustic cavity is acoustically communicated with the acoustic cavity through the sound guiding tube; wherein the second acoustic structure has a third resonant frequency, and values of at least two of the third resonant frequency, the first resonant frequency, and the second resonant frequency are the same.

12. The microphone of claim 1, further comprising a second acoustic structure and a third acoustic structure, wherein the second acoustic structure includes a second sound guiding tube and a second acoustic cavity;

the third acoustic structure includes a third sound guiding tube, a fourth sound guiding tube, and a third acoustic cavity;

the acoustic cavity is acoustically communicated with the third acoustic cavity through the third sound guiding tube;

the second acoustic cavity is acoustically communicated with the outside of the microphone through the second sound guiding tube and acoustically communicated with the third acoustic cavity through the fourth sound guiding tube; and the third acoustic cavity is acoustically communicated with the acoustoelectric transducer.

13. The microphone of claim 12, further including a first plate body, a second plate body, and a third plate body, wherein the third plate body is physically connected to the second plate body and the housing; wherein the first plate body and at least a portion of housing define the first cavity, the acoustoelectric transducer is located in the first cavity;

the first plate body, the second plate body, and the at least a portion of the housing define the third acoustic cavity;

the second plate body, the third plate body, and the at least a portion of the housing define the acoustic cavity; and the second plate body, the third plate body, and the at least a portion of the housing define the second acoustic cavity.

14. The microphone of claim 13, further including a sound inlet, wherein the sound inlet is provided in the first plate body, the third sound guiding tube and the fourth sound guiding tube are provided on the second plate body, the sound guiding tube is provided on a cavity wall forming the acoustic cavity, and the second sound guiding tube is provided on a cavity wall forming the second acoustic cavity.

15. The microphone of claim 12, wherein the second acoustic structure has a third resonant frequency, the third acoustic structure has a fourth resonant frequency;

the fourth resonant frequency, the third resonant frequency, the first resonant frequency, and the second resonant frequency are different, and an absolute value of a difference between any two of the fourth resonant frequency, the third resonant frequency, the first resonant frequency, and the second resonant frequency is within a range of 100 Hz-1000 Hz.

16. The microphone of claim 12, wherein the second acoustic structure has a third resonant frequency and the third acoustic structure has a fourth resonant frequency; and at least two resonant frequencies of the fourth resonant frequency, the third resonant frequency, the first resonant frequency, and the second resonant frequency are the same.

17. The microphone of claim 1, wherein an absolute value of a difference between a resonant frequency of the acoustic sub-structure and a resonant frequency of an acoustoelectric transducer corresponding to the acoustic sub-structure is not greater than 200 Hz.

18. The microphone of claim 17, wherein the resonant frequency of the acoustic sub-structure is equal to the resonant frequency of the acoustoelectric transducer corresponding to the acoustic sub-structure.

19. The microphone of claim 1, wherein a response sensitivity of the microphone at a resonant frequency of the acoustic sub-structure is greater than a response sensitivity of the acoustoelectric transducer at the resonant frequency of the acoustic sub-structure, and/or the response sensitivity of the microphone at a resonant frequency of the acoustoelectric transducer is greater than a response sensitivity of the acoustoelectric transducer at the resonant frequency of the acoustoelectric transducer.

* * * * *